(12) United States Patent
Nishizaki

(10) Patent No.: US 12,112,231 B2
(45) Date of Patent: Oct. 8, 2024

(54) DYNAMIC TWO-DIMENSIONAL CODE GROUP GENERATION METHOD AND SYSTEM

(71) Applicant: Ark Limited, Tokyo (JP)

(72) Inventor: Tsutao Nishizaki, Chuo-ku (JP)

(73) Assignee: ARK LIMITED, Chuo-ku (JP)

( * ) Notice: Subject to any disclaimer, the term of this patent is extended or adjusted under 35 U.S.C. 154(b) by 0 days.

(21) Appl. No.: 18/254,245

(22) PCT Filed: Nov. 29, 2021

(86) PCT No.: PCT/JP2021/043617
§ 371 (c)(1),
(2) Date: May 24, 2023

(87) PCT Pub. No.: WO2022/114180
PCT Pub. Date: Jun. 2, 2022

(65) Prior Publication Data
US 2024/0095479 A1    Mar. 21, 2024

(30) Foreign Application Priority Data

Nov. 30, 2020   (JP) ................................. 2020-198203

(51) Int. Cl.
*G06K 7/14*   (2006.01)
(52) U.S. Cl.
CPC ......... *G06K 7/1417* (2013.01); *G06K 7/1456* (2013.01); *G06K 7/1473* (2013.01)
(58) Field of Classification Search
CPC .. G06K 7/1417; G06K 7/1456; G06K 7/1473; G06K 19/06037; G06K 19/06046
See application file for complete search history.

(56) References Cited

U.S. PATENT DOCUMENTS

2006/0071076 A1*   4/2006   Tamayama ............... G06K 7/14
                                                                  235/472.01

FOREIGN PATENT DOCUMENTS

JP    2012181645 A    9/2012
JP    201449063 A     3/2014

OTHER PUBLICATIONS

International Preliminary Report on Patentability issued on May 30, 2023, in corresponding International Application No. PCT/JP2021/043617, 4 pages.

(Continued)

*Primary Examiner* — Matthew Mikels
(74) *Attorney, Agent, or Firm* — Maier & Maier, PLLC

(57) ABSTRACT

A dynamic two-dimensional code group generation method for generating a two-dimensional code group for dynamically displaying, repeatedly in sequence, a plurality of two-dimensional codes arranged in a time series includes a base identifying step of determining a first setting value of a base two-dimensional code serving as a base from among first setting values identified by evaluation values each associated with a corresponding one of the two-dimensional codes in the two-dimensional code group; and a data block arrangement step of generating and arranging a data block in a storage two-dimensional code identified on the basis of a second setting value corresponding to the first setting value determined in the base identifying step, the data block being based on content of target information to be coded.

15 Claims, 17 Drawing Sheets

(56) References Cited

OTHER PUBLICATIONS

International Search Report issued on Feb. 22, 2022, in corresponding International Application No. PCT/JP2021/043617; 4 pages.

* cited by examiner

FIG. 5

SETTING INFORMATION MANAGEMENT TABLE (1a)

SETTING INFORMATION TABLE

| SETTING INFORMATION ID | 0001 |
|---|---|
| SETTING INFORMATION ID | A02, A04, A05, A06, B01, CO2, D01, ... |
| COLLECTIVE INFORMATION | |
| NUMBER OF CODES: n | |
| BASE: YES | |
| DISPLAY TIME: ○ SEC/CODE | |
| REPETITION: YES | |
| DISPLAY AREA: XXX—XXX, YYY—YYY | |
| ⋮ | |
| SETTING INFORMATION ID | 0002 |
| ⋮ | |

DISPLAY INFORMATION TABLE

| DISPLAY INFORMATION ID | |
|---|---|
| A01 | INCLINATION (1 DEGREE TO 360 DEGREES) |
| A02 | DIRECTION (UP/DOWN/LEFT/RIGHT) |
| A03 | FRONT OR BACK (FRONT/BACK) |
| A04 | DISPLAY POSITION (COORDINATES X AND Y) |
| A05 | DISPLAY ORDER (n-TH) |
| A06 | CODE COLOR (#nnnnnn) |
| ⋮ | |

STANDARD MASK PATTERN TABLE

| STANDARD MASK PATTERN ID | |
|---|---|
| B01 | PATTERN 0 |
| B02 | PATTERN 1 |
| ⋮ | |
| B07 | PATTERN 6 |
| B08 | PATTERN 7 |

ERROR CORRECTION WORD INFORMATION TABLE (1b)

| ERROR CORRECTION WORD INFORMATION ID | |
|---|---|
| C01 | BEFORE ERROR CORRECTION PROCESSING |
| C02 | AFTER ERROR CORRECTION PROCESSING |

FUNCTION INFORMATION TABLE

| FUNCTION INFORMATION ID | |
|---|---|
| D01 | BASE TWO-DIMENSIONAL CODE |
| D02 | OTHER CONSTITUENT TWO-DIMENSIONAL CODES |
| D03 | STORAGE TWO-DIMENSIONAL CODE |
| ⋮ | |

FIG. 9
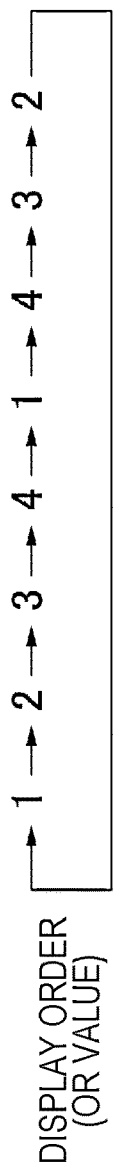
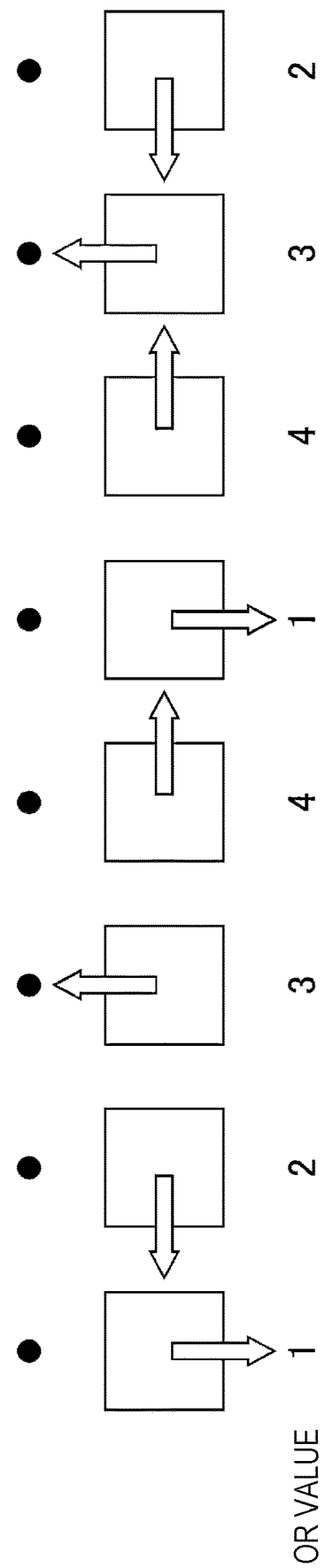

FIG. 10
LIGHT/DARK
PN(Positive/Negative)
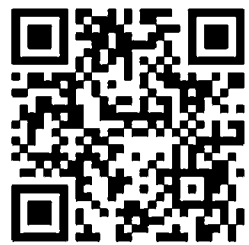 
| | | P(Positive) | N(Negative) |
|---|---|---|---|
| LIGHT/DARK | PN VALUE | 1 | 2 |

FIG. 11
(a)
|  | LIGHT POINT | DARK POINT |
|---|---|---|
| | 45 | 45 |
| EVALUATION VALUE OF PILOT 45 |  |  |
| | 0 | 1 |
(b)
|  | EVEN NUMBER | ODD NUMBER |
|---|---|---|
| EVEN/ODD VALUE OF TOTAL NUMBER OF DARK POINTS OF PILOTS 45  | | |
| P VALUE OF PILOT 45 | 0 | 1 |

FIG. 12

| | FIRST SETTING VALUE | | EVALUATION VALUE | | SECOND SETTING VALUE |
|---|---|---|---|---|---|
| | FIGURE NUMBER # | P VALUE OF PILOT | OR VALUE | EC VALUE | AMOUNT OF SHIFT FROM BASE TO STORAGE |
| BASE | 1 | 0 | 1 | 1 | 3 |
| | 2 | 0 | 1 | 2 | 2 |
| | 3 | 0 | 1 | 3 | 1 |
| | 4 | 0 | 1 | 4 | 4 |
| BASE | 5 | 0 | 2 | 1 | 2 |
| | 6 | 0 | 2 | 2 | 5 |
| | 7 | 0 | 2 | 3 | 1 |
| | 8 | 0 | 2 | 4 | 3 |
| BASE | 9 | 0 | 3 | 1 | 2 |
| | 10 | 0 | 3 | 2 | 4 |
| | 11 | 0 | 3 | 3 | 2 |
| | 12 | 0 | 3 | 4 | 1 |
| BASE | 13 | 0 | 4 | 1 | 3 |
| | 14 | 0 | 4 | 2 | 3 |
| | 15 | 0 | 4 | 3 | 4 |
| | 16 | 0 | 4 | 4 | 1 |

| | FIRST SETTING VALUE | | EVALUATION VALUE | | SECOND SETTING VALUE |
|---|---|---|---|---|---|
| | FIGURE NUMBER # | P VALUE OF PILOT | OR VALUE | EC VALUE | AMOUNT OF SHIFT FROM BASE TO STORAGE |
| BASE | 17 | 1 | 1 | 1 | 4 |
| | 18 | 1 | 1 | 2 | 1 |
| | 19 | 1 | 1 | 3 | 2 |
| | 20 | 1 | 1 | 4 | 3 |
| BASE | 21 | 1 | 2 | 1 | 3 |
| | 22 | 1 | 2 | 2 | 3 |
| | 23 | 1 | 2 | 3 | 4 |
| | 24 | 1 | 2 | 4 | 1 |
| BASE | 25 | 1 | 3 | 1 | 2 |
| | 26 | 1 | 3 | 2 | 1 |
| | 27 | 1 | 3 | 3 | 3 |
| | 28 | 1 | 3 | 4 | 5 |
| BASE | 29 | 1 | 4 | 1 | 1 |
| | 30 | 1 | 4 | 2 | 5 |
| | 31 | 1 | 4 | 3 | 2 |
| | 32 | 1 | 4 | 4 | 2 |

FIG. 13

| | FIRST SETTING VALUE | | EVALUATION VALUE | | SECOND SETTING VALUE |
|---|---|---|---|---|---|
| | FIGURE NUMBER # | P VALUE OF PILOT | OR VALUE | EC VALUE | AMOUNT OF SHIFT FROM BASE TO STORAGE |
| INDEX | 1 | 0 | 1 | 1 | 3 |
| | 2 | 0 | 1 | 2 | 2 |
| | 3 | 0 | 1 | 3 | 1 |
| | 4 | 0 | 1 | 4 | 4 |
| INDEX | 5 | 0 | 2 | 1 | 2 |
| | 6 | 0 | 2 | 2 | 5 |
| | 7 | 0 | 2 | 3 | 1 |
| | 8 | 0 | 2 | 4 | 3 |
| INDEX | 9 | 0 | 3 | 1 | 2 |
| | 10 | 0 | 3 | 2 | 4 |
| | 11 | 0 | 3 | 3 | 2 |
| | 12 | 0 | 3 | 4 | 1 |
| INDEX | 13 | 0 | 4 | 1 | 3 |
| | 14 | 0 | 4 | 2 | 3 |
| | 15 | 0 | 4 | 3 | 4 |
| | 16 | 0 | 4 | 4 | 1 |
| INDEX | 17 | 1 | 1 | 1 | 4 |
| | 18 | 1 | 1 | 2 | 1 |
| | 19 | 1 | 1 | 3 | 2 |
| | 20 | 1 | 1 | 4 | 3 |
| INDEX | 21 | 1 | 2 | 1 | 3 |
| | 22 | 1 | 2 | 2 | 3 |
| | 23 | 1 | 2 | 3 | 4 |
| | 24 | 1 | 2 | 4 | 1 |
| INDEX | 25 | 1 | 3 | 1 | 2 |
| | 26 | 1 | 3 | 2 | 1 |
| | 27 | 1 | 3 | 3 | 3 |
| | 28 | 1 | 3 | 4 | 5 |
| INDEX | 29 | 1 | 4 | 1 | 1 |
| | 30 | 1 | 4 | 2 | 5 |
| | 31 | 1 | 4 | 3 | 2 |
| | 32 | 1 | 4 | 4 | 2 |

FIG. 15
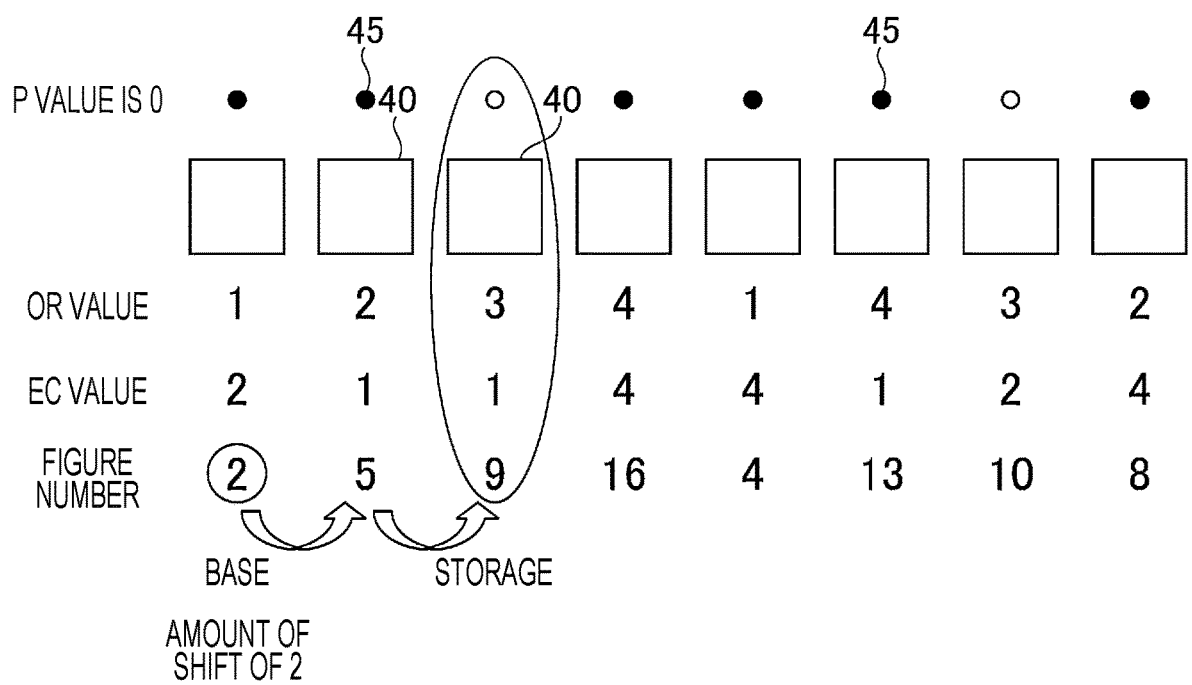
(a)
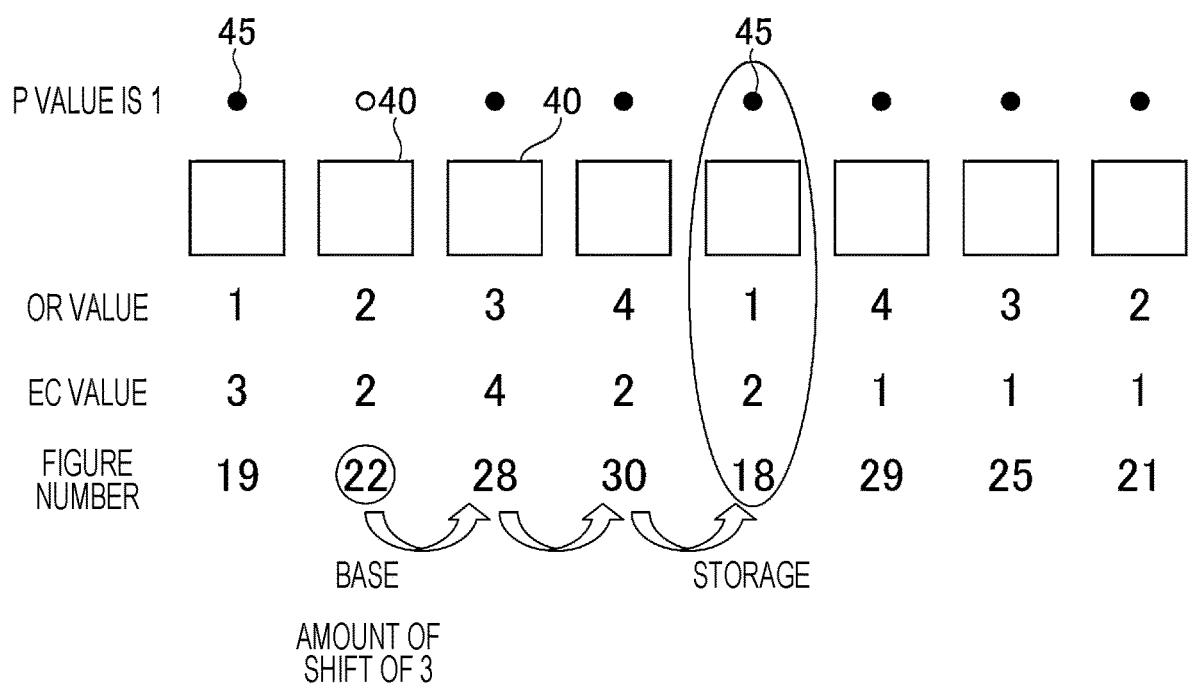
(b)

FIG. 16
(a)
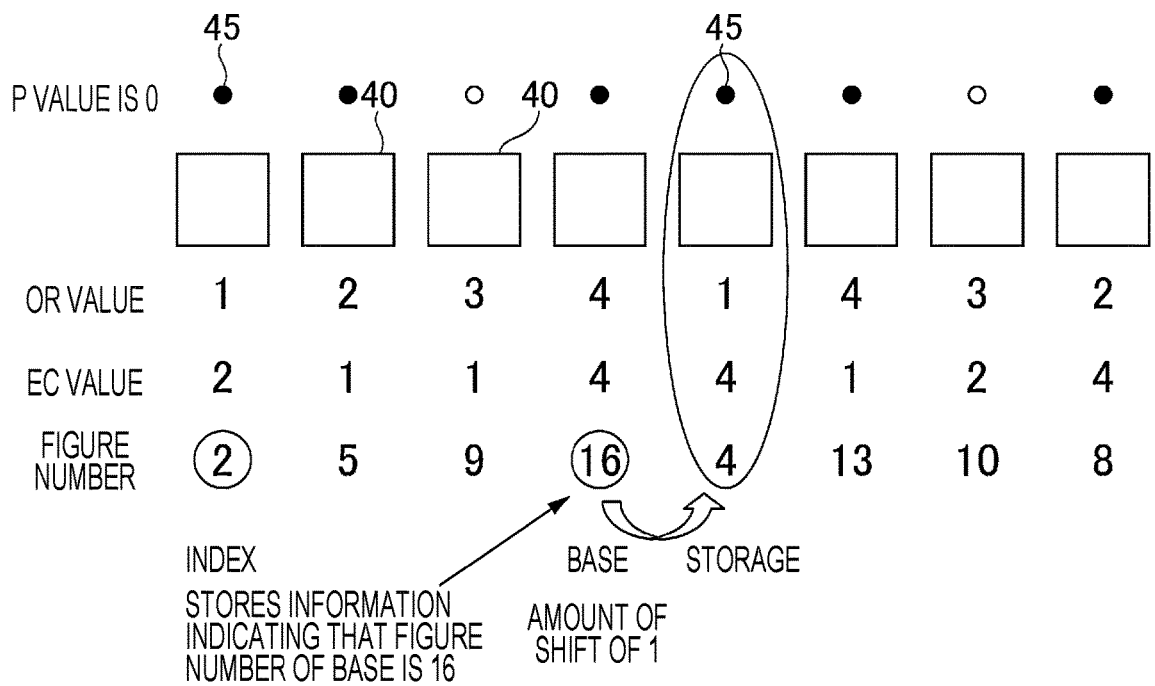
(b)
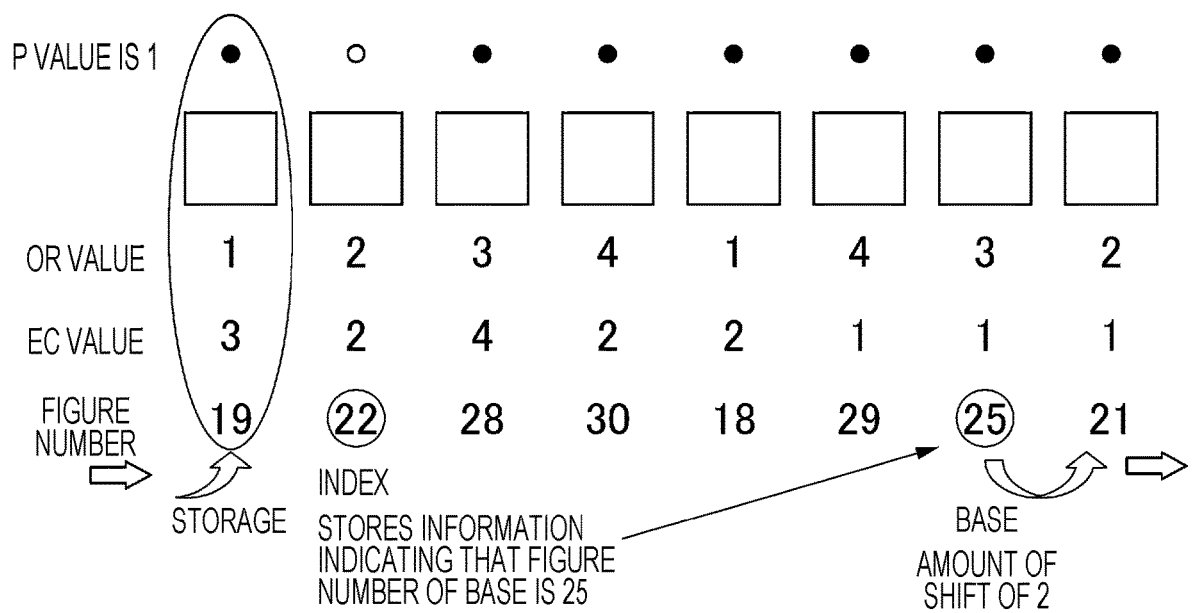

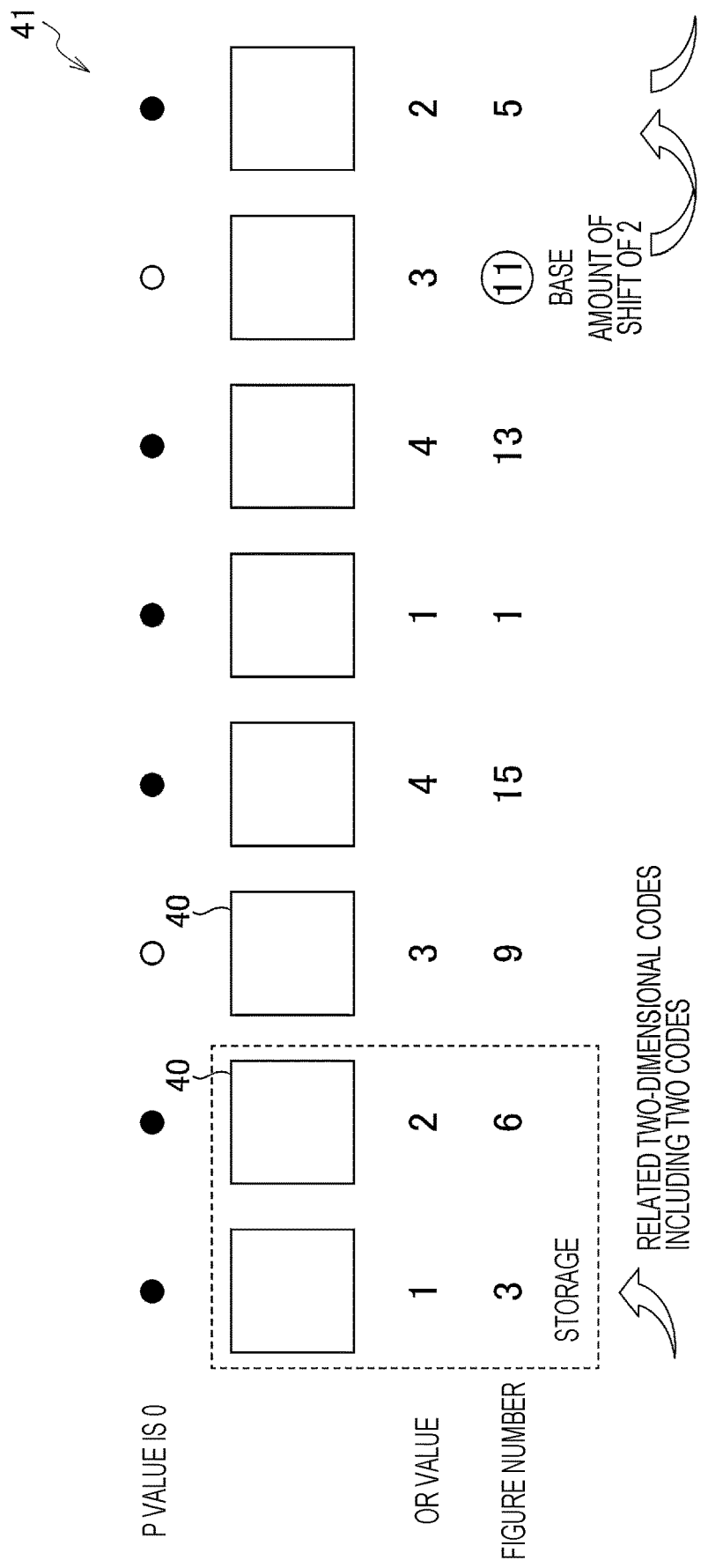

DYNAMIC TWO-DIMENSIONAL CODE GROUP GENERATION METHOD AND SYSTEM

TECHNICAL FIELD

The present invention relates to a dynamic two-dimensional code group generation method and system for generating a two-dimensional code group for dynamically displaying, repeatedly in sequence, a plurality of two-dimensional codes arranged in a time series.

BACKGROUND

One-dimensional code is a code symbol in which a pattern of arranged light and dark bars changes on a linear axis in a certain direction, and is generally known as a barcode. Two-dimensional code is a code symbol in two dimensions in which a pattern of arranged light and dark points (dots) or unit regions (modules) changes on a plane defined by vertical and horizontal X and Y axes. Various code symbols exist, such as QR code (registered trademark), DataMatrix (registered trademark), and PDF417.

One known system using a two-dimensional code is, for example, a system (see, for example, JP-A-2012-181645) in which a plurality of two-dimensional codes are displayed on the same screen and user authentication is performed based on the order in which displayed two-dimensional codes are read. Also known is an apparatus (see, for example, JP-A-2014-49063) in which the code symbol format of a two-dimensional code is made three-dimensional to store an increased amount of information and to form a code in three dimensions to enhance security performance more than the two-dimensional code.

In the system disclosed in JP-A-2012-181645, a user operates a reading device to read, from among n×m displayed two-dimensional codes, m correct two-dimensional codes having a predetermined number (m) of pieces of concatenated read data in the same order as arrangement positions stored in a storage means, whereby an authentication means of an authentication server can authenticate the user.

However, if a plurality of two-dimensional codes are displayed on the same screen, a typical reading device automatically reads two-dimensional codes located in a reading range. Thus, if the reading device is a distance away from the two-dimensional codes or if the display device has a small display area, a wrong two-dimensional code may be read, resulting in incorrect authentication. In addition, the two-dimensional codes are fixed images that can be easily copied, and there is a risk that the codes may be tampered with or forged.

The apparatus disclosed in JP-A-2014-49063 captures images of a three-dimensional code composed of code parts having different heights a plurality of times while changing the imaging plane in a height direction of the code parts to acquire pieces of image data, and combines the acquired pieces of image data to read information on the three-dimensional code.

However, it is necessary to form codes in three dimensions for three-dimensional conversion. Such codes are not suitable for widely spread applications of electronic display using typical two-dimensional codes, and are difficult to mass-produce in consideration of marketability or to distribute as electronic data. This leads to problems in practical use. In addition, the codes formed in three dimensions themselves are fixed objects that can be duplicated, and thus there is a risk that the codes may be tampered with or forged.

SUMMARY

The present invention has been made in view of the problems described above, and an object thereof is to provide a dynamic two-dimensional code evaluation method, a dynamic two-dimensional code evaluation system, and a dynamic two-dimensional code evaluation program using a plurality of two-dimensional codes that are dynamically changed and displayed in a series.

A dynamic two-dimensional code group generation method according to the present invention is a dynamic two-dimensional code group generation method for generating a two-dimensional code group for dynamically displaying, repeatedly in sequence, a plurality of two-dimensional codes arranged in a time series. The dynamic two-dimensional code group generation method includes a base identifying step of determining a first setting value of a base two-dimensional code serving as a base from among first setting values identified by evaluation values each associated with a corresponding one of the two-dimensional codes in the two-dimensional code group; and a data block arrangement step of generating and arranging a data block in a storage two-dimensional code identified on the basis of a second setting value corresponding to the first setting value determined in the base identifying step, the data block being based on content of target information to be coded.

Further, a dynamic two-dimensional code group generation system according to the present invention is a dynamic two-dimensional code group generation system for generating a two-dimensional code group for dynamically displaying, repeatedly in sequence, a plurality of two-dimensional codes arranged in a time series. The dynamic two-dimensional code group generation system includes base identifying means for determining a first setting value of a base two-dimensional code serving as a base from among first setting values identified by evaluation values each associated with a corresponding one of the two-dimensional codes in the two-dimensional code group; and data block arrangement means for generating and arranging a data block in a storage two-dimensional code identified on the basis of a second setting value corresponding to the first setting value determined by the base identifying means, the data block being based on content of target information to be coded.

Further, a dynamic two-dimensional code group according to the present invention is a dynamic two-dimensional code group including a two-dimensional code group for dynamically displaying, repeatedly in sequence, a plurality of two-dimensional codes arranged in a time series. A first setting value of a base two-dimensional code serving as a base is determined from among first setting values identified by evaluation values each associated with a corresponding one of the two-dimensional codes in the two-dimensional code group, and a data block based on content of target information to be coded is generated and arranged in a storage two-dimensional code identified on the basis of a second setting value corresponding to the determined first setting value.

According to the present invention having the configuration described above, it is possible to complicate the setting of a set of two-dimensional codes before images of the two-dimensional codes are captured, a set of two-dimensional codes after images of the two-dimensional codes are captured, or the evaluation of a two-dimensional code, and to prevent tampering with or forgery of two-dimensional codes to be dynamically displayed.

According to the present invention having the configuration described above, furthermore, if an index two-dimensional code can be picked up simply mechanically by a combination of an OR value and an EC value, a storage two-dimensional code can be indirectly identified therefrom, and target information described therein is read to obtain desired information. Thus, the load of information processing can be extremely reduced. In addition, according to the present invention, the remaining two-dimensional codes may be configured in any form as long as the geometric requirements associated with the figure numbers are satisfied.

BRIEF DESCRIPTION OF DRAWINGS

FIG. 5 is a schematic diagram illustrating an example of a setting information management table in an embodiment of the present invention.

FIG. 9 is a diagram for explaining details of the OR value.

FIG. 10 is a diagram for explaining a setting example of an EC value.

FIG. 11 includes diagrams for explaining a setting example of a P value (parity value) of a pilot.

FIG. 12 is a diagram illustrating an example of a table describing the relationship among an evaluation value constituted by an OR value, an EC value, and a P value (parity value), a first setting value, and a second setting value.

FIG. 13 is a diagram illustrating another example of a table describing the relationship among an evaluation value constituted by an OR value, an EC value, and a P value (parity value), a first setting value, and a second setting value.

FIG. 15 includes diagrams illustrating an example of identifying a base two-dimensional code and a storage two-dimensional code in a direct designation mode.

FIG. 16 includes diagrams illustrating an example of identifying a base two-dimensional code and a storage two-dimensional code in an indirect designation mode.

FIG. 17 is a diagram for explaining an operation in a related code configuration mode.

DETAILED DESCRIPTION OF EMBODIMENTS

An example of a dynamic two-dimensional code evaluation system in an embodiment to which the present invention is applied will be described hereinafter with reference to the drawings.

An example configuration of a QR code symbol in the present embodiment will be described with reference to FIG. 1.

QR Code (Example of Two-Dimensional Code) According to Present Embodiment

First, a QR code as an example of a two-dimensional code used in the present embodiment will be described. In the following description, the QR code is based on the JIS X 0510 2004 "two-dimensional code symbol—QR code—" specification of Japanese Industrial Standard (hereinafter simply referred to as "JIS standard" in some cases), or ISO/ISE Standard 18004 2015 "Automatic identification and data capture techniques—QR Code bar code symbology specification", ISO/IEC Standard 16022 2006 "Information technology—Automatic identification and data capture techniques—Data Matrix bar code symbology specification", or ISO/IEC standard 15438 2015 "Information technology—Automatic identification and data capture techniques—PDF417 bar code symbology specification", unless otherwise specified. An encoder conforming to the JIS standard or the ISO/ISE standard is referred to as a standard encoder, and a decoder conforming to the JIS standard or the ISO/ISE standard is referred to as a standard decoder.

Further, an encoder and a decoder capable of handling private data codewords (private information) that are private (hidden) are referred to as an enhanced encoder (not illustrated) and an enhanced decoder, respectively. The enhanced encoder and the enhanced decoder may constitute a dynamic two-dimensional code evaluation system. The example described above merely adopts the QR code format. The compliant format is not limited, and may not be completely compliant with a so-called standard specification. For example, the geometric format may conform to the standard specification, but the logical configuration may be non-compliant with the standard specification to apply a data hiding technique or the like.

In the dynamic two-dimensional code evaluation system constituted by the enhanced encoder and the enhanced decoder, the QR code is assumed to be a two-dimensional code in which public information or private information, or public information and private information can be recorded at the same time or different times (such a QR code may be referred to as an enhanced QR code). The public information is information that is readable by a decoder based on the JIS standard (standard decoder). In contrast, the private information is information that is not readable by the standard decoder and can only be extracted by the enhanced decoder.

In the following description, a "codeword" is defined as having a length of 8 bits. However, a "codeword" may have a length of 16 bits or any other length, such as a length of 1 bit, depending on the system.

Figure 1:
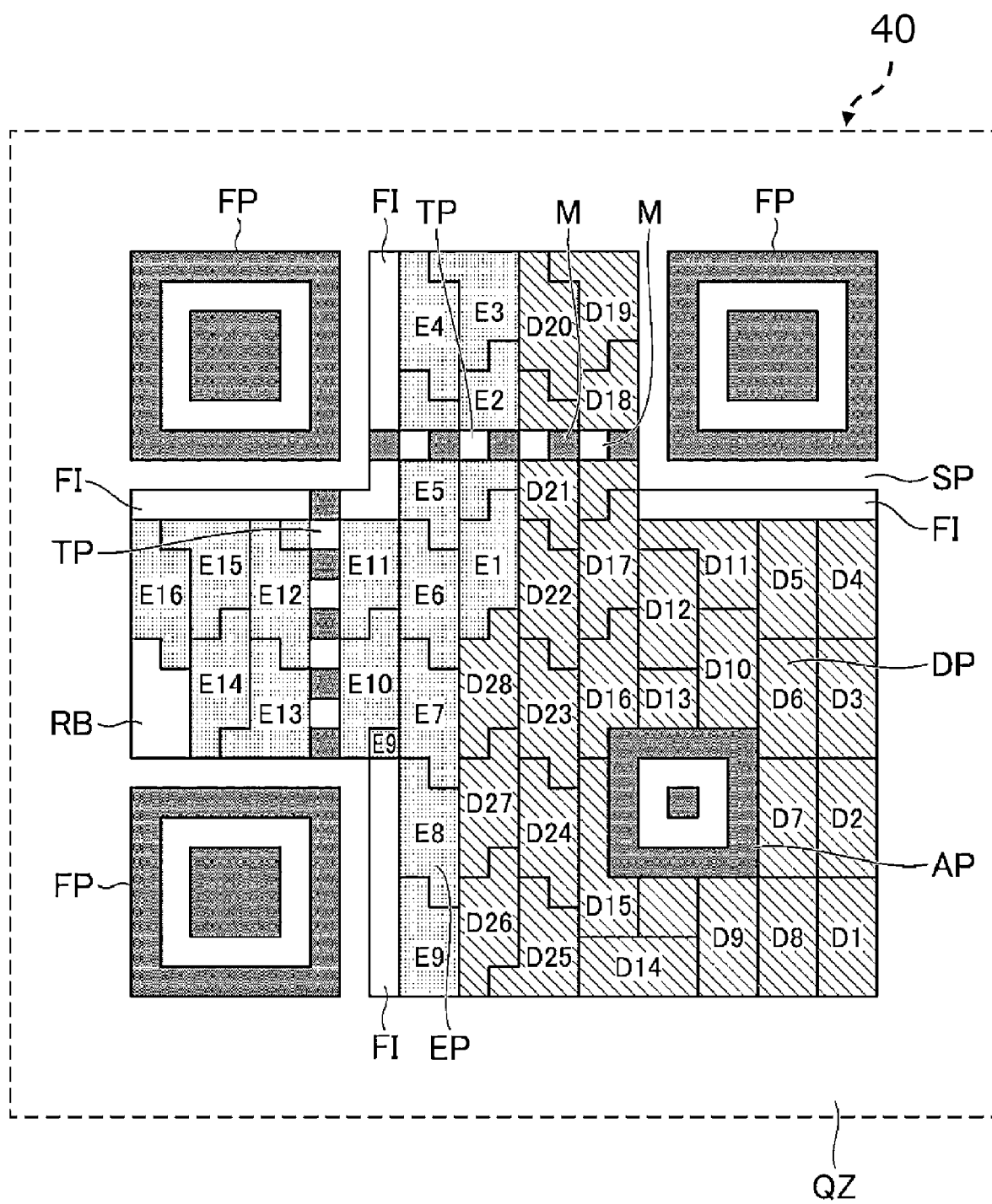
FIG. 1 is a schematic diagram illustrating an example configuration of a QR code symbol.

FIG. 1 is an explanatory diagram of a two-dimensional code 40 (QR code symbol). The two-dimensional code 40 (hereinafter also referred to simply as the "QR code") is prepared in various sizes from Version 1 to Version 40. In one example, the functions of Model "2" will be described as an example.

The two-dimensional code 40 has function patterns and an encoding region. The function patterns are patterns necessary for searching for a symbol position of the two-dimensional code 40 and identifying the characteristics of the two-dimensional code 40, which are necessary for assisting in decoding within modules of the two-dimensional code 40. The encoding region is a region where necessary information is written.

The function patterns include position detection patterns FP, separation patterns SP, a timing pattern TP, an alignment pattern AP, and a quiet zone QZ.

The position detection patterns FP are patterns arranged at least at three corners of the two-dimensional code 40. At the time of reading, the three position detection patterns FP are identified, which enables correct recognition of the direction and position of the code symbol of the two-dimensional code 40.

The separation patterns SP are patterns of light modules arranged around the position detection patterns FP, and are each one module wide. Thus, the position detection patterns FP can be distinguished from the code symbol of the two-dimensional code 40.

Modules M are unit cells constituting the code symbol of the two-dimensional code 40. In principle, one bit corresponds to one module. A set of a plurality of modules M, each of which is a unit cell included in the two-dimensional code 40, is referred to as a module group.

The timing pattern TP is a pattern of dark modules and light modules that are alternately arranged one by one in a straight line. The timing pattern TP enables recognition of the number of modules of the code symbol of the two-dimensional code 40. Thus, the model number of the two-dimensional code 40 can be identified.

The alignment pattern AP is a pattern arranged at a position determined by the model number of the two-dimensional code 40. In the case of a large module, the alignment pattern AP serves to assist in searching for the position of the two-dimensional code 40.

The quiet zone QZ is a region of light modules provided around authentication information 0, and is at least four modules wide.

The encoding region includes a data codeword, an error correction codeword (hereinafter simply referred to as a "correction codeword" in some cases), and format information FI. In the foregoing description, the functions of Model "2" have been described as an example. For example, version information (VI) (not illustrated) is additionally provided for a model with a large number. The format information FI includes information on an error correction level and a standard mask pattern (a mask pattern defined in the JIS standard). In the case of the two-dimensional code 40, the standard mask pattern is typically one of eight mask display patterns (0 to 7), and any one of the pattern numbers is set. The set pattern number optimizes the variations in the arrangement of the light and dark modules constituting the two-dimensional code 40.

The data codeword and the error correction codeword are data representing information and an error correction codeword for correcting an error when the data has failed to be read, and are generated and arranged. The format information includes information related to the error correction level applied to the two-dimensional code 40 and the standard mask pattern used. The format information serves as an encoding pattern necessary for decoding the encoding region.

Figure 2:
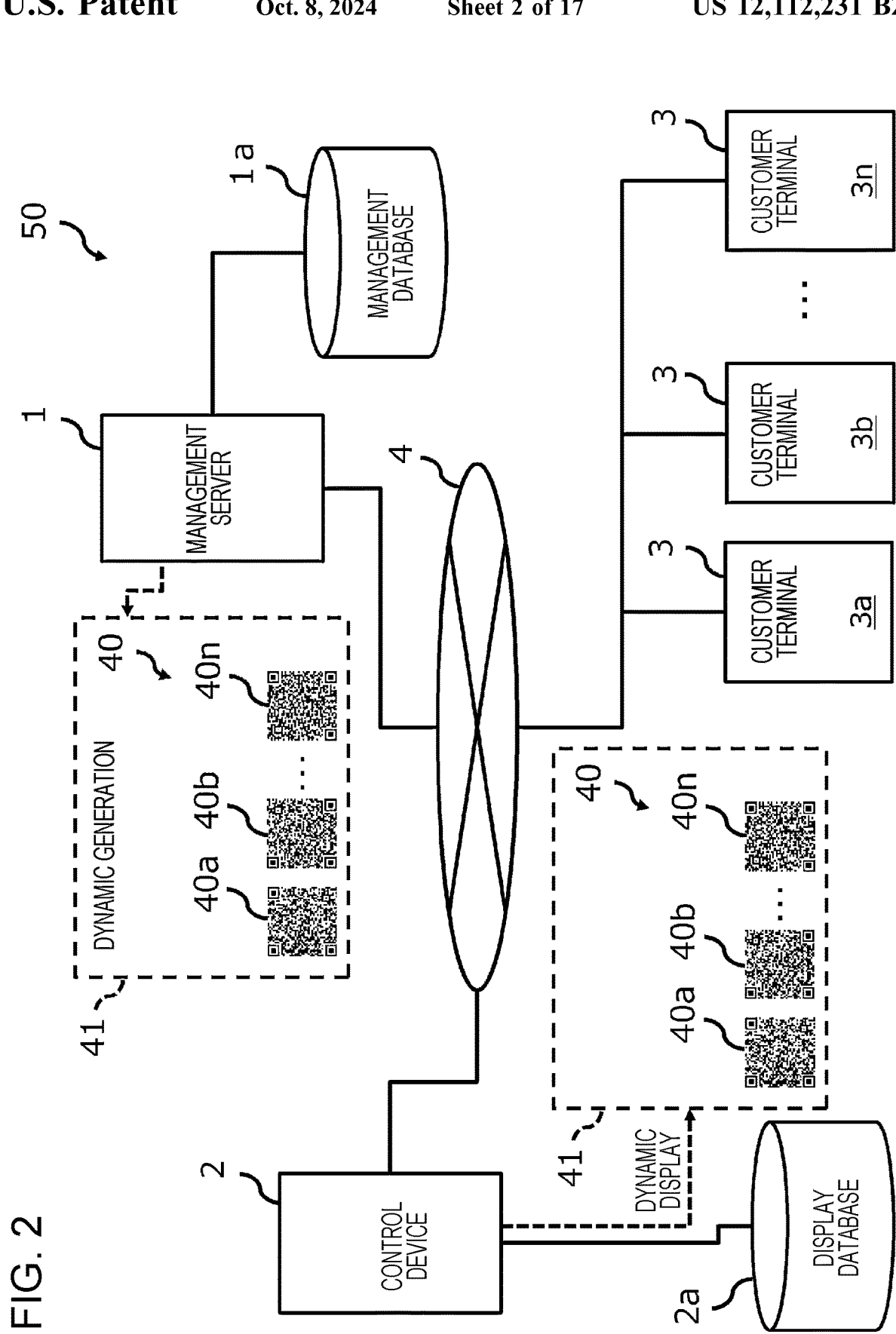
FIG. 2 is a schematic diagram illustrating an example overall configuration of a dynamic two-dimensional code evaluation system according to an embodiment of the present invention.

FIG. 2 is a block diagram illustrating the overall configuration of a dynamic two-dimensional code evaluation system 50. As illustrated in FIG. 2, the dynamic two-dimensional code evaluation system 50 includes a management server 1.

The management server 1 includes a management database 1a, and is constituted by a control device 2 and a plurality of customer terminals 3. The dynamic two-dimensional code evaluation system 50 is connected to the control device 2, the plurality of customer terminals 3, and so on via a public communication network 4 (network). The customer terminals 3 capture images of a plurality of two-dimensional codes 40 included in a two-dimensional code group 41 that is dynamically displayed by the control device 2, evaluate the respective captured images of the two-dimensional codes 40, and receive various kinds of information and services.

The dynamic two-dimensional code evaluation system 50 sequentially displays the plurality of two-dimensional codes 40 included in the two-dimensional code group 41, which is generated by the management server 1, on a screen, a display, or the like included in the control device 2, for example, in a facility such as an event site or a live venue, in a station area, on a street, in other stores or various facilities, in an office, or in a house. The plurality of two-dimensional codes 40 are displayed on the screen, the display, or the like at a speed of, for example, 50 milliseconds per frame like a moving image.

The control device 2 is connected to the management server 1. The management server 1 permits access from the control device 2, and transmits the plurality of two-dimensional codes 40 included in the two-dimensional code group 41, which is stored in the management database 1a, to the customer terminals 3 together with setting information and evaluation information, which are set in advance by an administrator or the like. The customer terminals 3 capture, using the customer terminals 3, images of the two-dimensional codes 40 sequentially displayed on the screen, the display, or the like included in the control device 2.

The management server 1 generates the two-dimensional code group 41 according to actual use.

The management server 1 transmits the generated two-dimensional code group 41 or the two-dimensional codes 40 to the control device 2. The management server 1 refers to information on a transmission destination such as a person concerned, a staff member, or a customer stored in the management database 1a and transmits the generated two-dimensional code group 41 or the two-dimensional codes 40.

The two-dimensional code group 41 generated by the management server 1, or the two-dimensional codes 40, may be electronically generated or may be generated (printed) in such a manner that one of the two-dimensional codes 40 is fixedly displayed on a printed product, a package, or the like as an evaluation target, for example. The two-dimensional code group 41 generated by the management server 1, or the two-dimensional codes 40, is written and transmitted to each distribution destination (such as a person concerned, a staff member, or a customer) as URL information to be displayed on the customer terminals 3 via sending means such as electronic mail or mail.

The control device 2 may store the two-dimensional code group 41 received from the management server 1 in a display database 2 of the control device 2, and may display the plurality of two-dimensional codes 40 from the stored two-dimensional code group 41 on the basis of the setting information.

The control device 2 includes a screen, a display, or the like (not illustrated) that displays the two-dimensional codes 40 (such as a two-dimensional code 40a, a two-dimensional code 40b, and a two-dimensional code 40n) included in the two-dimensional code group 41.

The customer terminals 3 are each held by a customer (person who takes a photograph or person who captures an image). For example, the customer captures images of the plurality of two-dimensional codes 40, which are sequentially displayed on a screen, a display, or the like in a facility such as an event site or a live venue, in a station area, on a street, in other stores or various facilities, in an office, or in a house, on the spot by using an image capturing function or application included in the customer terminal 3. The two-dimensional codes 40 whose images are captured with the customer terminal 3 may be sequentially stored in a storage unit of the customer terminal 3, described below, or may be stored in a storage unit (not illustrated) allocated on a cloud. The customer terminal 3 may further store, for example, at a specific or any timing, two or more two-dimensional codes 40 selected by the customer terminal 3 from within the two-dimensional code group 41 to be dynamically displayed. The customer terminal 3 stores the two-dimensional codes 40 at a specific or any timing, thereby achieving efficient storage in a memory of the customer terminal 3.

<Customer Terminal 3>

Figure 3:
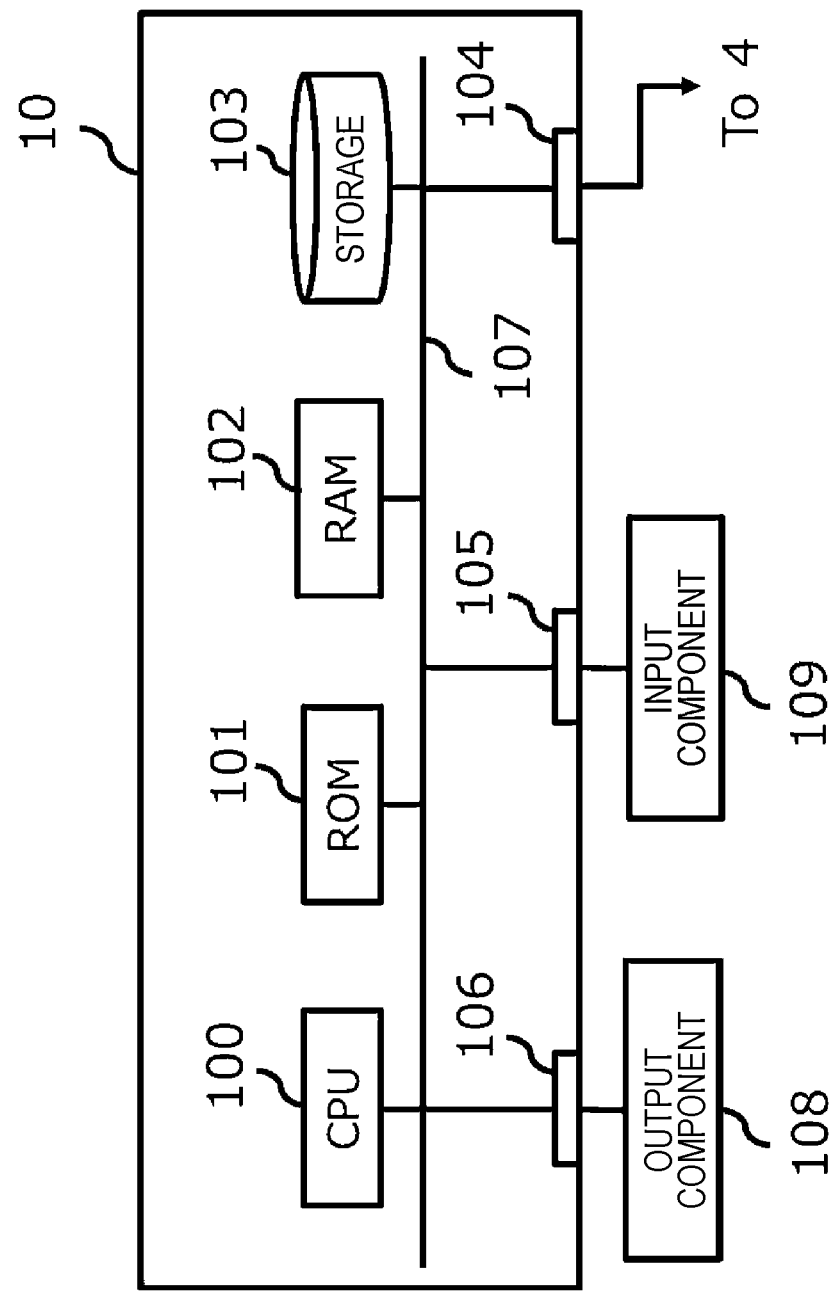
FIG. 3 is a schematic diagram illustrating an example configuration of a customer terminal in an embodiment of the present invention.

FIG. 3 is a schematic diagram illustrating an example configuration of the customer terminal 3 (a customer terminal 3a, a customer terminal 3b, or a customer terminal 3c). Examples of the customer terminal 3 include electronic devices such as a smartphone and a tablet terminal, as well as a personal computer (PC). The customer terminal 3 includes a housing 10, a CPU (Central Processing Unit) 100, a ROM (Read Only Memory) 101, a RAM (Random Access Memory) 102, storage 103, and I/Fs 104 to 106. The components 100 to 106 are connected through an internal bus 107.

The CPU 100 performs the overall control of the customer terminal 3. The ROM 101 stores an operation code of the CPU 100. The RAM 102 is a work area used when the CPU 100 is in operation. The storage 103 stores various kinds of information such as setting information and evaluation information. Examples of the storage 103 include an SSD (solid state drive) as well as an HDD (Hard Disk Drive). The customer terminal 3 may include a GPU (Graphics Processing Unit) (not illustrated), for example. The GPU provides higher-speed arithmetic processing than usual.

The I/F 104 is an interface for transmitting and receiving various kinds of information to and from the management server 1, the control device 2, and so on via the public communication network 4.

The I/F 105 is an interface for transmitting and receiving information to and from an input component 109. Examples of the input component 109 include a keyboard and a touch panel. A customer, an administrator, or the like who uses the dynamic two-dimensional code evaluation system 50 inputs or selects various kinds of information, a control command of the customer terminal 3, or the like through the input component 109.

The I/F 106 is an interface for transmitting and receiving various kinds of information to and from an output component 108. The output component 108 outputs various kinds of information stored in the storage 103, a processing status of the customer terminal 3, or the like. Examples of the output component 108 include a display. The display may be, for example, a touch panel display. In this case, the output component 108 may include the input component 109.

Figure 4:
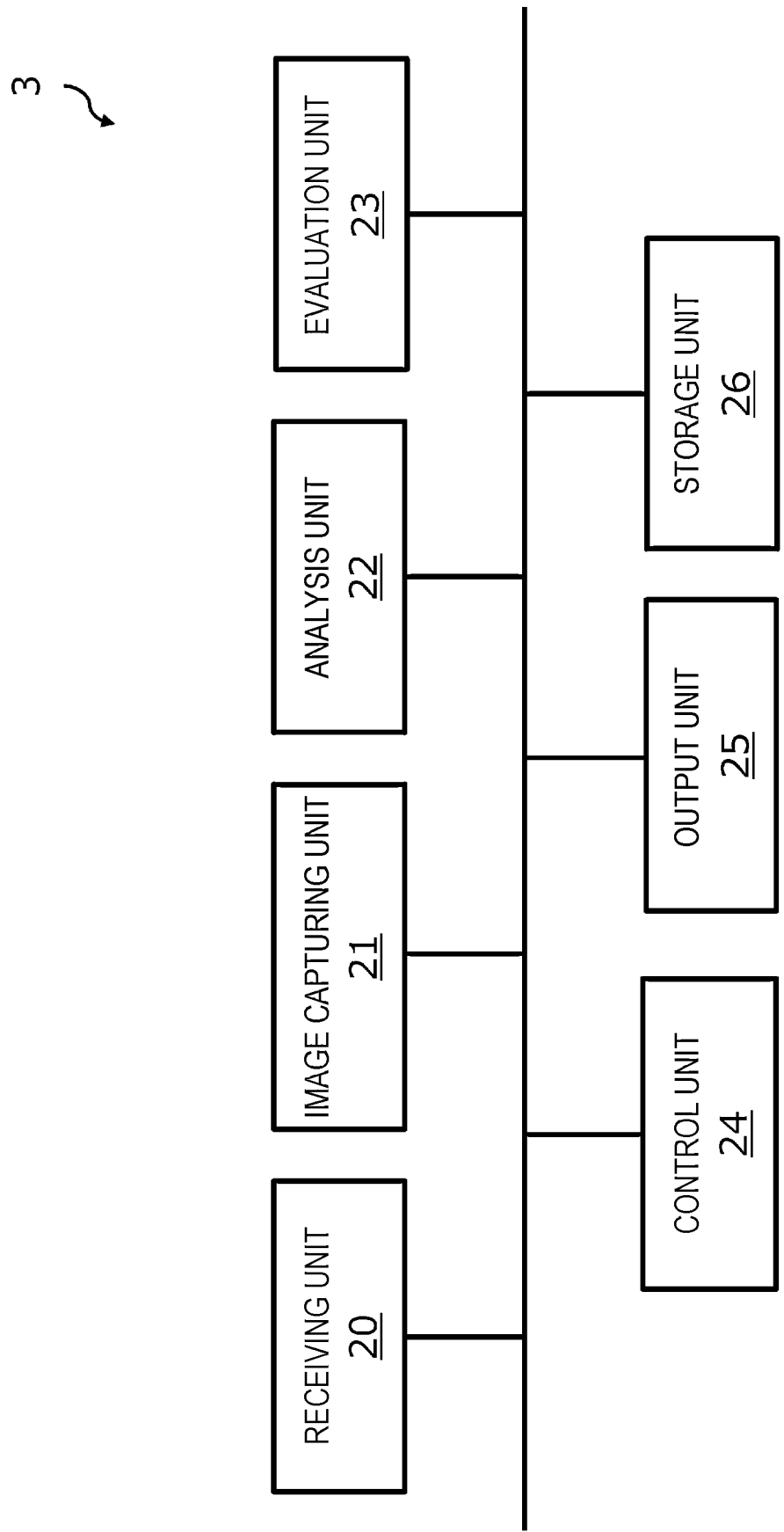
FIG. 4 is a schematic diagram illustrating an example of functions of the customer terminal in an embodiment of the present invention.

FIG. 4 is a schematic diagram illustrating an example of functions of the customer terminal 3. The customer terminal 3 includes, for example, a receiving unit 20, an image capturing unit 21, an analysis unit 22, an evaluation unit 23, a control unit 24, an output unit 25, and a storage unit 26. The functions illustrated in FIG. 4 are implemented by the CPU 100 executing a program stored in the storage 103 or the like by using the RAM 102 as a work area. The functions may be controlled by, for example, artificial intelligence. The term "artificial intelligence" may be based on any known artificial intelligence technology.

<Receiving Unit 20>

The receiving unit 20 receives setting information for analyzing the plurality of two-dimensional codes 40, which are dynamically displayed by the control device 2 and constitute the two-dimensional code group 41, and evaluation information for evaluating an analysis result obtained by the customer terminal 3 or an external server or the like (not illustrated). To output (display) the two-dimensional code group 41, the receiving unit 20 also receives the two-dimensional code group 41 generated on the basis of the setting information. The two-dimensional code group 41 received by the receiving unit 20 is dynamically displayed on the basis of the setting information.

The setting information received by the receiving unit 20 is, for example, various kinds of setting information stored in advance in the management database 1a of the management server 1 and associated with setting information IDs registered in a setting information management table 1b. The evaluation information is, for example, various kinds of evaluation information associated by evaluation information IDs registered in an evaluation information management table 1c stored in advance in the evaluation information management table 1c.

<Setting Information Management Table 1b>

FIG. 5 illustrates various kinds of information stored in the setting information management table 1b. In the setting information management table 1b, setting information for authentication or identification of a two-dimensional code 40 whose image is to be captured is stored in association with the two-dimensional code 40. A setting information table stores a setting information ID for each set of two-dimensional codes 40. The setting information ID is set as setting information common to the set of two-dimensional codes 40. Therefore, for example, if a plurality of two-dimensional codes 40 are to be dynamically displayed, a common setting information ID is set for all of the two-dimensional codes 40 related to the dynamic display.

<Setting Information Table>

The setting information table is generated by the management server 1. The generated setting information table is transmitted to the customer terminal 3 through the management server 1. The setting information table transmitted to the customer terminal 3 is information to be locally analyzed by the customer terminal 3, and may be analyzed by the management server 1, for example. The setting information management table 1b received by the receiving unit 20 of the customer terminal 3 stores, for example, various kinds of information for analyzing and evaluating the two-dimensional codes 40. Items set in the setting information management table 1b are set by, for example, the administrator or the like of the management server 1. The set items are associated with each other by, for example, a setting information table, a standard mask pattern table, an error correction word information table, a function information table, and a display information table.

Various setting information IDs set in the setting information management table 1b are set as appropriate in accordance with the use of the present invention. This setting is made for a plurality of two-dimensional codes 40 to be dynamically displayed, which are evaluation targets.

A setting information ID is assigned to a plurality of two-dimensional codes 40 constituting a two-dimensional code group 41 to be evaluated, and is set as "0001" or "0002", for example. Settings identified by each setting information ID include, for example, setting information in the display information table, such as "A02 (direction)", "A04 (display position)", "A05 (display order)", and "A06 (light and dark colors of the code)". The settings also include setting information in the standard mask pattern table, such as "B01 (pattern 0)", and setting information in the function information table, such as "D01 (base two-dimensional code)", "D02 (other constituent two-dimensional codes)", and "D03 (storage two-dimensional code)". No setting of the error correction word information table is made. This indicates that no error correction word information is set, and any item is set.

The setting information table further includes collective information. The collective information is information for setting an operation related to the dynamic display, and various kinds of information are set, examples of which include the number of two-dimensional codes 40 constituting a two-dimensional code group 41 to be dynamically displayed, a display time per two-dimensional code 40 to be dynamically displayed (or total time for all of the two-dimensional codes 40), and coordinates (X-axis and Y-axis) of a display position on the display or the screen of the customer terminal 3.

The various kinds of information set in the setting information table may be set as, for example, any one of setting items or may be set as a combination of all of the setting items.

The display information table includes, for example, "A01 (inclination: 1 degree to 360 degrees), "A02: direction (up/down/left/right)", "A03: front or back side (front/back) of an inverted mirror image of the code symbol", "A04: display position (X-axis and Y-axis)", "A05: display order (n-th)", and "A06: code color". It is arbitrary to which value or the like each item is set.

The standard mask pattern table includes, for example, eight types "B01 (pattern 0)" to "B08 (pattern 7)" as information indicating standard mask patterns. Typically, the standard mask pattern is automatically determined on the basis of the standard specification of the QR code. However, it is arbitrary which standard mask pattern to set, and the standard mask pattern can be set in combination with other setting information. For example, a maximum of 32 different settings can be set when standard mask patterns are combined with display directions (up/bottom/left/right) of the two-dimensional code 40. Thus, any one or a plurality of combinations of them may be set as an evaluation target (for example, "A02: direction (up)", "B01 (pattern 2)", etc.) of the two-dimensional codes 40 constituting the two-dimensional code group 41.

In the error correction word information table, for example, specific information can be included in the area of an error correction word before and after the processing of the error correction word. This information is an area that would be deleted after the processing of the error correction word. The information is included in this area as the evaluation target, which makes it possible to evaluate the two-dimensional code 40 to be evaluated from among the plurality of two-dimensional codes 40 constituting the two-dimensional code group 41 to be dynamically displayed. The error correction word information table includes "C01 (before error correction processing)" and "C02 (after error correction processing)" as information indicating before and after the processing of the error correction word. It is optional which one to set as the area.

The function information table includes description of information related to functions assigned to the two-dimensional codes 40. For example, classifications of the functions, such as "D01 (base two-dimensional code)", "D02 (other constituent two-dimensional codes)", and "D03 (storage two-dimensional code)", are described.

<Evaluation Information Management Table 1c>

Figure 6:
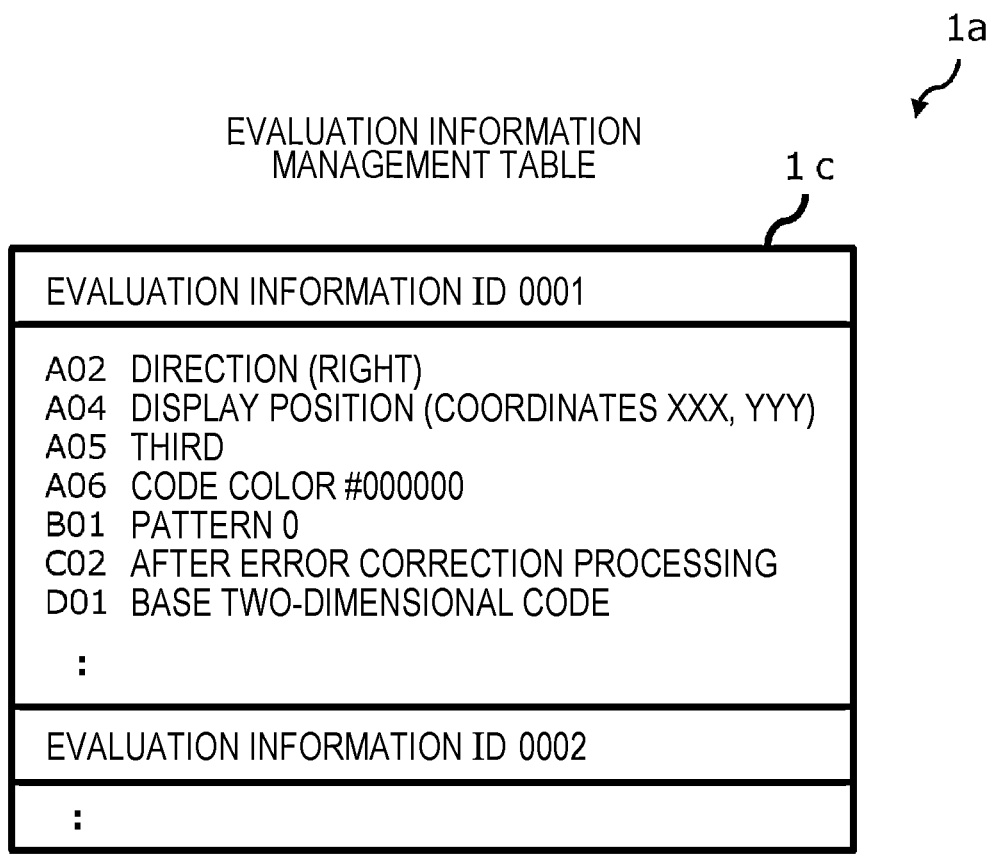
FIG. 6 is a schematic diagram illustrating an example of an evaluation information management table in an embodiment of the present invention.

FIG. 6 illustrates various kinds of information stored in the evaluation information management table 1c. The evaluation management information table 1c stores evaluation information for authentication or identification of the two-dimensional codes 40 whose images are captured from the two-dimensional codes 40 constituting the two-dimensional code group 41 to be dynamically displayed. The evaluation information management table 1c stores, for each two-dimensional code group 41, an evaluation information ID of a two-dimensional code 40 to be evaluated. One or a plurality of evaluation information IDs are set as evaluation information common to a plurality of two-dimensional codes 40 constituting each two-dimensional code group 41. Therefore, for example, if a two-dimensional code group 41 to be dynamically displayed is constituted by a plurality of two-dimensional codes 40, all of the two-dimensional codes 40 to be dynamically displayed are evaluated in common.

The various evaluation information IDs set in the evaluation information management table 1c are set as appropriate and reflected in the plurality of two-dimensional codes 40 to be dynamically displayed.

The evaluation information IDs are assigned to a plurality of groups of two-dimensional codes 40 to be evaluated, and are set as "0001" and "0002", for example. Settings identified by each evaluation information ID include, for example, descriptions of the evaluation information for the respective items set in the display information table described above, such as "right" for "A02 (direction)", "coordinates XXX, YYY" for "A04 (display position)", "third" for "A05 (display order)", and "#000000" for "A06 (code color)". Further, "B01 (pattern 0)", "C02 (after error correction processing)", and "D01 (base two-dimensional code)" are set as evaluation information.

<Image Capturing Unit 21>

The image capturing unit 21 captures images of the dynamically displayed two-dimensional codes 40 displayed by the control device 2. For example, the image capturing unit 21 activates an image capturing function (camera function) or an image capturing application included in the customer terminal 3 to capture an image. The image may be a still image or a moving image. The image capturing unit 21 captures an image of the two-dimensional code group 41 or images of the two-dimensional codes 40, and stores the image or images in the storage 103 of the customer terminal 3 or the storage unit 26 of the customer terminal 3 described below.

When capturing an image of the two-dimensional code group 41 or images of the two-dimensional codes 40, the image capturing unit 21 may also acquire various kinds of information related to image capturing conditions such as an image capturing date and time and an image capturing location, and store the information in the storage 103, the storage unit 26, or the like in association with the captured two-dimensional code group 41 or each of the captured two-dimensional codes 40.

<Analysis Unit 22>

The analysis unit 22 analyzes the captured two-dimensional code group 41 or the captured two-dimensional codes 40 on the basis of the setting information. The analysis may be performed by the analysis unit 22 of the customer terminal 3, or may be performed by, for example, the management server 1 if the analysis cannot be processed by the customer terminal 3 due to security reasons. In this case, the customer terminal 3 may receive the analysis result.

The analysis unit 22 performs analysis on the basis of various kinds of setting information related to the two-dimensional code group 41 or the two-dimensional codes 40 received by the receiving unit 20. Which of the setting information IDs the analysis unit 22 is to use to analyze the captured two-dimensional code group 41 or the captured two-dimensional codes 40 may be determined by the management server 1, the control device 2, and the customer terminal 3 in advance. A person who captures a code image uses the customer terminal 3 to select a setting information ID to be set for the two-dimensional code group 41 or the two-dimensional code 40 whose image is to be captured from among the plurality of displayed setting information IDs. The analysis unit 22 analyzes each setting of the two-dimensional code 40 on the basis of the settings identified by the selected setting information ID.

The analysis unit 22 analyzes the setting information received by the receiving unit 20 on the basis of the setting items included in the setting information, in accordance with the structure of the captured two-dimensional code group 41 or the captured two-dimensional code 40, the dynamically displayed state, the change or order of the two-dimensional code group 41 to be dynamically displayed, or the like.

For example, the analysis unit 22 compares each of the setting items and the setting information of the captured two-dimensional code group 41 or the captured two-dimensional code 40, which are received in advance, with the setting information included in the setting item. The setting items are items such as "A01 (inclination: 1 degree to 360 degrees)", "A02: direction (up/down/left/right)", "A03: front or back side (front/back) of an inverted mirror image of the code symbol", "A04: display position (X-axis and Y-axis)", "A05: display order (n-th)", "A06: code color (#nnnnnn)", "B01 (pattern 0)" to "B08 (pattern 71)", "C01 (before error correction)", "C02 (after error correction)", "D01 (base two-dimensional code)", "D02 (other constituent two-dimensional codes)", and "D03 (storage two-dimensional code)", for example. Each of the setting items constituting the captured two-dimensional code 40 is compared with a corresponding one of the pieces of setting information recorded in the setting information management table 1*b* to determine whether a difference is found for any one of the setting items set in advance as the setting information. Based on the setting information of the two-dimensional code group 41, the analysis unit 22 compares whether a specific setting item matches for the two-dimensional code group 41 or the two-dimensional code 40, and analyzes the captured two-dimensional code group 41 or two-dimensional code 40 from the comparison result. For these setting items, a plurality of pieces of setting information can be set and analyzed.

From the analysis result, if no difference is found between the setting items constituting the captured two-dimensional code group 41 or two-dimensional code 40 and the setting items set in advance as the setting information and the collective information, the analysis unit 22 determines that the two-dimensional code group 41 or the two-dimensional code 40 is a correct evaluation target. Accordingly, it is possible to distinguish and exclude a two-dimensional code group 41 or two-dimensional code 40 that may be tampered with or forged from a two-dimensional code group 41 or two-dimensional code 40 that is an evaluation target.

On the other hand, if a difference is found between the setting items constituting the captured two-dimensional code group 41 or two-dimensional code 40 and the setting items set in advance as the setting information, the analysis unit 22 determines that the two-dimensional code group 41 or the two-dimensional code 40 is not an evaluation target, and terminates the analysis processing. Then, the analysis unit 22 waits for capturing an image of a two-dimensional code group 41 or two-dimensional code 40 to be dynamically displayed next. In addition to analyzing the two-dimensional code group 41 or the two-dimensional code 40 whose image is captured by the image capturing unit 21, the analysis unit 22 may read a two-dimensional code group 41 or two-dimensional code 40 from the storage 103 of the customer terminal 3 and analyze the read two-dimensional code group 41 or two-dimensional code 40. The analysis of the two-dimensional code group 41 or the two-dimensional code 40 may be performed by, for example, an external server or the like instead of the customer terminal 3.

<Evaluation Unit 23>

If it is determined that the two-dimensional code group 41 or the two-dimensional code 40 is an evaluation target in accordance with the analysis result obtained by the analysis unit 22, the evaluation unit 23 further performs evaluation based on the evaluation information received in advance by the receiving unit 20. Specifically, the evaluation unit 23 evaluates each setting information condition of the setting information analyzed by the analysis unit 22 on the basis of each piece of target information stored in the evaluation information management table 1*c*.

The evaluation unit 23 refers to the evaluation information stored in the evaluation information management table 1*c* and evaluates whether evaluation information is set, such as "right" for "A02 (direction)", "coordinates XXX, YYY" for "A04 (display position)", "third" for "A05 (display order)", "#000000" for "A06 (code color)", and "pattern 0" for "B01 (standard mask pattern)", for example.

<Control Unit 24>

The control unit 24 controls the receiving unit 20, the image capturing unit 21, the analysis unit 22, the evaluation unit 23, the output unit 25, and the storage unit 26 of the customer terminal 3.

<Output Unit 25>

The output unit 25 outputs the analysis result obtained by the analysis unit 22 and the evaluation result obtained by the evaluation unit 23. In addition to transmitting the analysis result and the evaluation result to the output component 108 through the I/F 106, the output unit 25 may transmit the analysis result or the evaluation result to the management server 1, the control device 2, and the like through the I/F 104, for example. The output unit 25 may output, for example, various conditions of the setting information and the like.

<Storage Unit 26>

The storage unit 26 stores various kinds of information, namely, the setting information received by the receiving unit 20 and the evaluation information, in the storage 103. The storage unit 26 extracts various kinds of information such as the information tables stored in the storage 103, as necessary. Each of the information tables stores various kinds of information such as previous setting information and evaluation information acquired in advance.

<Management Server 1>

The management server 1 stores a database related to various kinds of information as the management database 1*a*. For example, various kinds of information transmitted via the public communication network 4 are accumulated in the management database 1*a*. As the various kinds of information, the setting information management table 1*b* and the evaluation information management table 1*c*, which will be described below, are stored, and information similar to that in the storage 103 may further be stored. The various kinds of information may be transmitted and received to and from the control device 2 and the customer terminal 3 via the public communication network 4.

Further, the management server 1 may cause the analysis unit 22 (not illustrated) to perform part or all of the analysis processing, for example, in case of a malfunction of the customer terminal 3 or in consideration of the processing capability, security, or the like of the customer terminal 3, or the amount of information or the like of the two-dimensional code group 41 or the two-dimensional codes 40 to be processed.

<Control Device 2>

The control device 2 has a configuration (not illustrated) similar to that of the customer terminal 3 described above, and is implemented as an electronic device such as a personal computer (PC). The output component 108 of the control device 2 includes, for example, a large display or a projector to display or project a two-dimensional code group 41 or a two-dimensional code 40. The two-dimensional code group 41 or the two-dimensional code 40 is controlled by the control unit 24 of the control device 2 so that the same two-dimensional code 40 is sequentially displayed or projected on the respective displays or screens.

The control device 2 stores, as the display database 2*a*, a database related to various kinds of information related to a two-dimensional code group 41 or two-dimensional code 40 to be dynamically displayed. For example, various kinds of information transmitted via the public communication network 4 are accumulated in the display database 2*a*. As the various kinds of information, setting information related to display or projection of the two-dimensional code group 41 or the two-dimensional code 40 in the control device 2 is stored. The control device 2 displays or projects the two-dimensional code group 41 or the two-dimensional code 40 on the basis of the setting information stored in the display database 2*a*. The display database 2*a* stores various kinds of information, and the various kinds of information may be transmitted and received to and from the management server 1 and the customer terminal 3 via the public communication network 4. In addition, a moving image may be transmitted and distributed from the management server 1.

In the present invention, the control device 2 may read a two-dimensional code group or a two-dimensional code displayed through a display unit (not illustrated) of the customer terminal 3. It should be understood that the constituent elements mounted on the customer terminal 3 described above may also be mounted on the control device 2 to allow the control device 2 to read the two-dimensional code group or the two-dimensional code.

<Public Communication Network 4>

The public communication network 4 is an Internet network or the like to which the management server 1, the control device 2, the customer terminal 3, and so on are connected through a communication circuit. The public communication network 4 may be implemented as a so-called optical fiber communication network. Further, the public communication network 4 is not limited to a wired communication network, and may be implemented by a wireless communication network. Alternatively, typical radio waves for TV broadcasting such as terrestrial or satellite broadcasting may be used.

Figure 7:
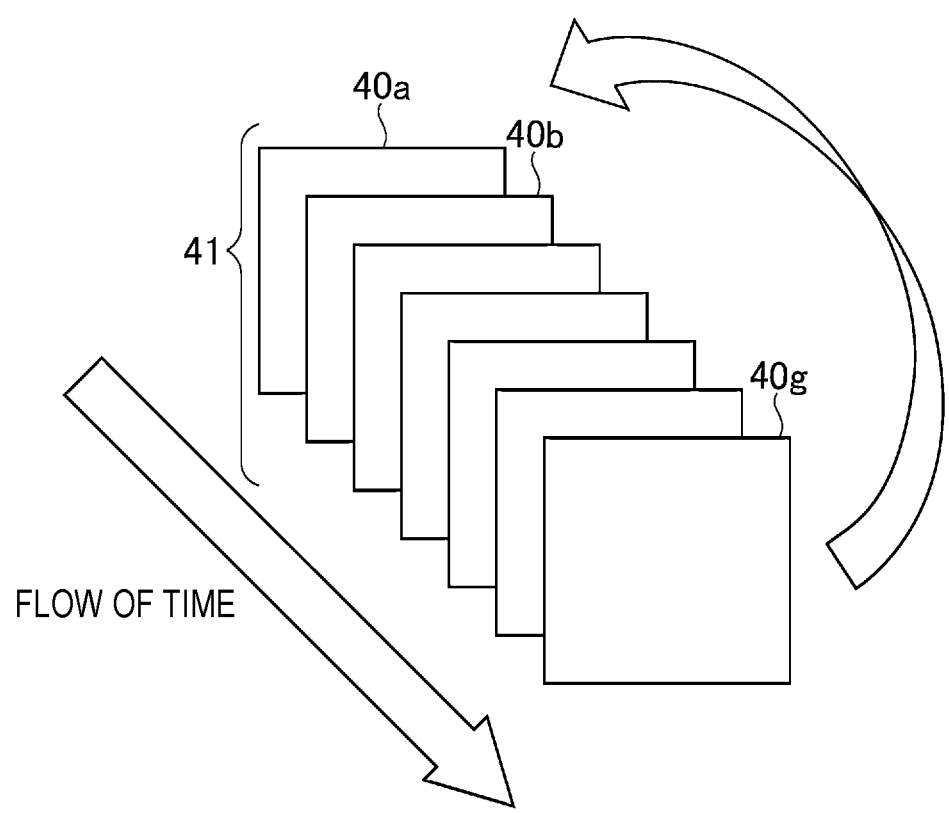
FIG. 7 is a diagram illustrating a two-dimensional code group for dynamically displaying, repeatedly in sequence, a plurality of two-dimensional codes arranged in a time series.

Next, a specific operation of the dynamic two-dimensional code evaluation system 50 to which the present invention is applied will be described. In the present invention, as illustrated in FIG. 7, information stored in a two-dimensional code group 41 for dynamically displaying, repeatedly in sequence, a plurality of two-dimensional codes 40 arranged in a time series is extracted. Each of the two-dimensional codes 40 is provided with changes such as arrangement of light and dark modules constituting the code symbol, information stored in the code symbol, information codewords, error correction codewords, the standard specification (such as QR or DataMatrix) of the configuration format of the code symbol, the configuration style (such as the model number, correction capacity, and mask pattern) of the code symbol, the orientation (up, down, left, or right) of the code symbol, the color of light and dark modules (including light and dark reversal), the front or back side (inverted mirror image), and a codeword at a specific position among data-block constituting codewords including a data codeword and an error correction codeword constituting the two-dimensional code. Such two-dimensional codes 40 serving as still images are arranged in a time series to form the two-dimensional code group 41. The two-dimensional codes 40 are displayed such that two-dimensional codes 40*a*, 40*b*, etc. are displayed one after another in chronological order until a last two-dimensional code 40*g* is displayed. After the two-dimensional code 40*g* is displayed, the first two-dimensional code, namely, the two-dimensional code 40*a*, is displayed again. That is, the display is repeated in a time series.

A moving image constituted by the two-dimensional code group 41 may form a piece of information as a whole. Alternatively, one specific two-dimensional code 40 or two or more specific two-dimensional codes 40 may store one or two or more pieces of information.

A concept in which one or two or more pieces of information are stored in one specific two-dimensional code 40 or two or more specific two-dimensional codes 40 and are read will be described hereinafter.

The two-dimensional codes 40 constituting the two-dimensional code group 41 can be classified into the following types.

Index Two-Dimensional Code

In the two-dimensional code group 41, the relative origin on the time axis is defined and, accordingly, each of the two-dimensional codes 40 can be described by the distance from the origin on the time axis or by the order. When a two-dimensional code 40 corresponding to the relative origin on the time axis is referred to as a base two-dimensional code, an index two-dimensional code plays a role of indicating the features (i.e., specifications) of the base two-dimensional code as a constituent element to identify the base two-dimensional code. The features of the index two-dimensional code are defined in advance. When the features (specifications) appear, a reader (the analysis unit 22 and the evaluation unit 23) of the corresponding two-dimensional code 40 unconditionally, or mechanically, recognizes the two-dimensional code 40 as the index two-dimensional code.

Base Two-Dimensional Code

The base two-dimensional code is identified by a first setting value stored in the index two-dimensional code in a given two-dimensional code group 41. The base two-dimensional code serves as the base. This code is used as the start point or origin of the series of codes on the time axis, and the relative order of appearance of other constituent two-dimensional codes can be uniquely identified. Typically, only one base two-dimensional code can exist in the two-dimensional code group 41. However, the present invention is not limited thereto, and two or more base two-dimensional codes may exist. The identified base two-dimensional code can indicate a relative position from the base two-dimensional code by using an amount of shift to a storage two-dimensional code described below.

Storage Two-Dimensional Code

The storage two-dimensional code is a two-dimensional code 40 that stores target information to be stored. The relative position of the storage two-dimensional code on the time axis is designated through the base two-dimensional code described above.

Target Information

The target information refers to information indicated by the two-dimensional code group 41. The target information is not necessarily stored only in the storage two-dimensional code, and may be stored in two or more other storage two-dimensional codes including the storage two-dimensional code and designated by the storage two-dimensional code.

That is, in the concept of the dynamic two-dimensional code evaluation system 50 to which the present invention is applied, the base two-dimensional code identified by the index two-dimensional code is set as the origin, and the target information constituted by the information stored in the storage two-dimensional code indicated by the base two-dimensional code is set as the "data", that is, the "true value".

Next, a method of identifying the base two-dimensional code by using the index two-dimensional code and identifying the storage two-dimensional code indicated by the base two-dimensional code will be described.

In the present invention, first, each of the two-dimensional codes 40 constituting the two-dimensional code group 41 (the two-dimensional codes 40 are hereinafter referred to as constituent two-dimensional codes) is associated with an evaluation value in advance. As described below, the evaluation value is constituted by a combination of an OR (ORientation) value and an EC value. The OR value is defined on the basis of a geometric feature of the two-dimensional code 40. The EC value is defined on the basis of a logical feature of the two-dimensional code 40.

The OR (ORientation) value indicates a code orientation, and more specifically, indicates a relative orientation from a pilot 45. The pilot 45 is a mark placed immediately outside the so-called quiet zone (blank region) surrounding the two-dimensional code 40. The shape of the pilot 45 is not particularly defined, and may be a circle, a square, a star shape, or the like inscribed in the region. The role of the pilot 45 is to indicate the origin of the direction to determine the orientation of the two-dimensional code 40. The pilot 45 enables recognition of the origin of the direction to determine the orientation of the two-dimensional code 40 by using the pilot 45 even if the reader fails to capture an image of the two-dimensional code 40 in a correct direction or position.

Figure 8:
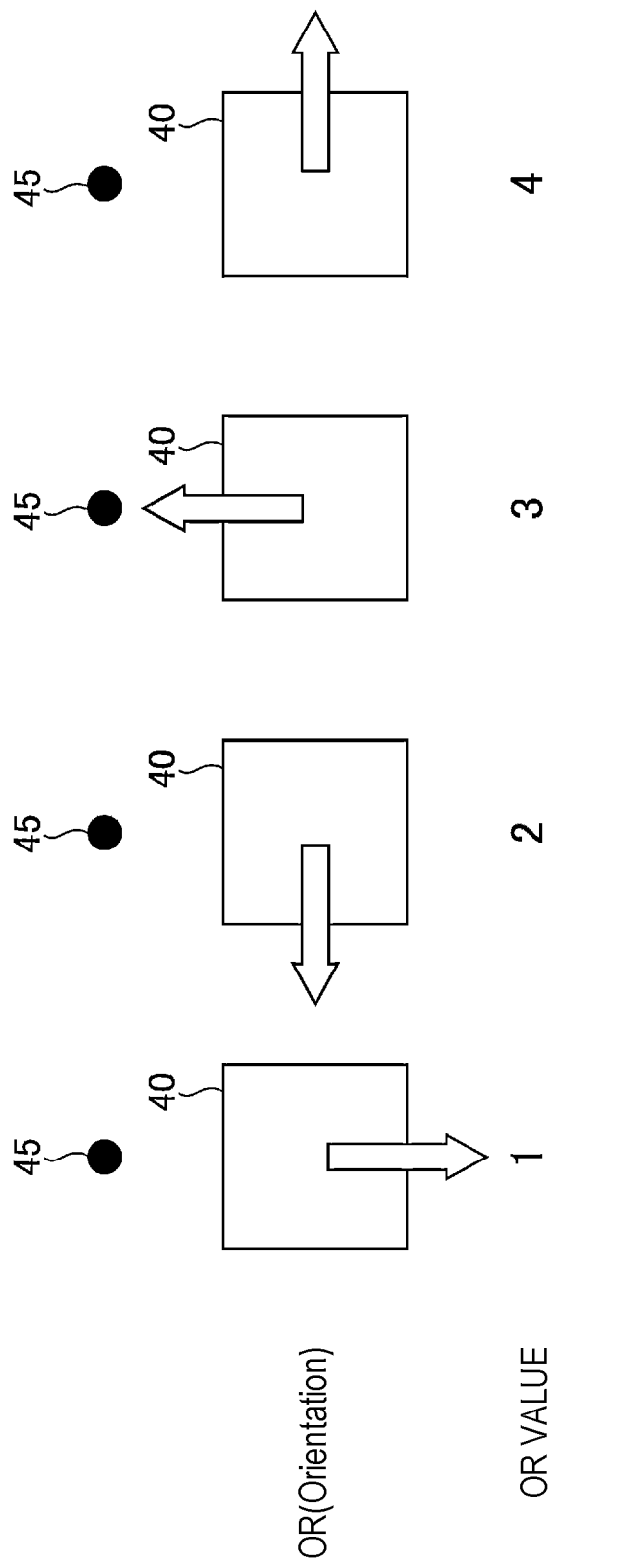
FIG. 8 is a diagram illustrating the relationship between a pilot and an OR value for a code orientation.

FIG. 8 illustrates the relationship between the pilot 45 and OR values for code orientations. In an example of FIG. 8, the OR value is set to 2 when the code "orientation" is 90° counterclockwise from the direction indicated by the pilot 45. The OR value is set to 1 when the code "orientation" is exactly opposite to the direction indicated by the pilot 45. The OR value is set to 3 when the code "orientation" is the same as the direction indicated by the pilot 45. The OR value is set to 4 when the code "orientation" is 90° clockwise from the direction indicated by the pilot 45.

However, the setting example of the OR value in FIG. 8 is an example, and the OR value may be set on the basis of any rule between code "orientations" and the direction indicated by the pilot 45. As illustrated in FIG. 9, the OR value may be repeatedly set to "1", "2", "3", "4", "1", "4", "3", and "2" in this order for the respective two-dimensional codes 40 constituting the two-dimensional code group 41 in order of display time, for example. In this case, the pilot 45 and the code orientations are sequentially switched in the manner as illustrated in FIG. 9. The order of display time of the OR values is not limited to that described above. However, it is desirable that the two-dimensional codes 40 be arranged such that the change in the direction of the geometry is not monotonous.

Further, the number of OR values repeated in a sequence is not limited to eight as illustrated in FIG. 9, and may be any number. However, it is desirable to set OR values such that the "start point" and the "end point" of a sequence of repeated OR values do not have the same value. The reason is to prevent the change in the direction of the geometry from being monotonous because otherwise the two-dimensional codes 40 at the "end point" and the "start point" would be displayed in the same orientation twice in a row in a sequence from the "end point" to the "start point".

The EC (Error Correction) value is a numerical value associated with an index indicating an error correction capacity level of the two-dimensional code 40 among four error correction capacity levels. The indices composed of L, M, Q, and H as the four error correction capacity levels are assigned numerals 1 to 4, respectively.

In the present invention, furthermore, a feature of the pilot 45 is also read as data for extracting the features of the appearance of the two-dimensional code 40. As for the value of the pilot 45, as illustrated in FIG. 11(*a*), a white circular object with white in the center is set as a light point, and the evaluation value of the pilot 45 is set to 0. Likewise, a black circular object filled with black is set as a dark point, and the evaluation value of the pilot 45 is set to 1.

Further, to read the features of the pilots 45, as illustrated in FIG. 11(*b*), all of the pilots 45 may be composed of black circular objects, and a representation of the number of pilots 45 that are black circular objects arranged around the two-dimensional codes 40 may be used. If the number of pilots 45 is an even number, the P values (parity values) of the pilots 45 are set to 0. Likewise, if the number of pilots 45 is an odd number, the P values (parity values) of the pilots 45 are set to 1.

The features of the pilots 45 include numerical values represented by the pilots 45 arranged from the base, even/odd parity values of the pilots 45 when the pilots 45 are numerically evaluated, and an arrangement mode of the pilots 45 from the base.

The OR value and the EC value described above are assigned to each of the two-dimensional codes 40 in the two-dimensional code group 41 as the evaluation value. For example, it can be understood that a two-dimensional code 40 having the OR value=4 and the EC value=2 is a code with "90° rightward and the correction level M". Further, if the evaluation value of the pilot 45 is 1, it can be understood that the pilot 45 is constituted by a dark point.

Alternatively, the evaluation value may be constructed on the basis of a PN (Positive/Negative) value, which is a value indicating a light or dark appearance of the two-dimensional code 40. FIG. 10 illustrates a setting example of the PN value. Each two-dimensional code 40 is assigned a light appearance and a dark appearance. P (Positive) is set for the appearance constituted by a lighter color, and N (Negative) is set for the appearance constituted by a darker color.

Alternatively, the evaluation value may be determined on the basis of a model number (size) of 1 to 40.

Alternatively, the evaluation value may be determined on the basis of a standard mask number of 0 to 7.

In the following example, a case where the evaluation value is constituted by the P value (parity value), the OR value, and the EC value among the values described above will be described as an example. The evaluation value is associated with the first setting value. FIG. 12 illustrates an example of a table describing the relationship between the first setting value and the evaluation value constituted by the P value, the OR value, and the EC value. The first setting value is also referred to as a figure number. A figure number of 1 to 32 is assigned to each evaluation value constituted by a P value, an OR value, and an EC value. This indicates that evaluation values constituted by respective P values, OR values, and EC values correspond to figure numbers (first setting values) on a one to-one basis.

The base two-dimensional code and the index two-dimensional code are assigned through the figure numbers. In the example of FIG. 12, figure numbers 2, 7, 11, 14, 17, 22, 26, and 31 are assigned to the base two-dimensional code. A mode for identifying the base two-dimensional code through a figure number is referred to as a direct designation mode.

As illustrated in FIG. 13, a mode for assigning the index two-dimensional code to an evaluation value including a P value, an OR value, and an EC value through the corresponding figure number is referred to as an indirect designation mode.

The assignment example of the figure numbers in FIGS. 12 and 13 is merely an example. Any other figure numbers may be assigned to the base two-dimensional code and the index two-dimensional code.

Figure 14:
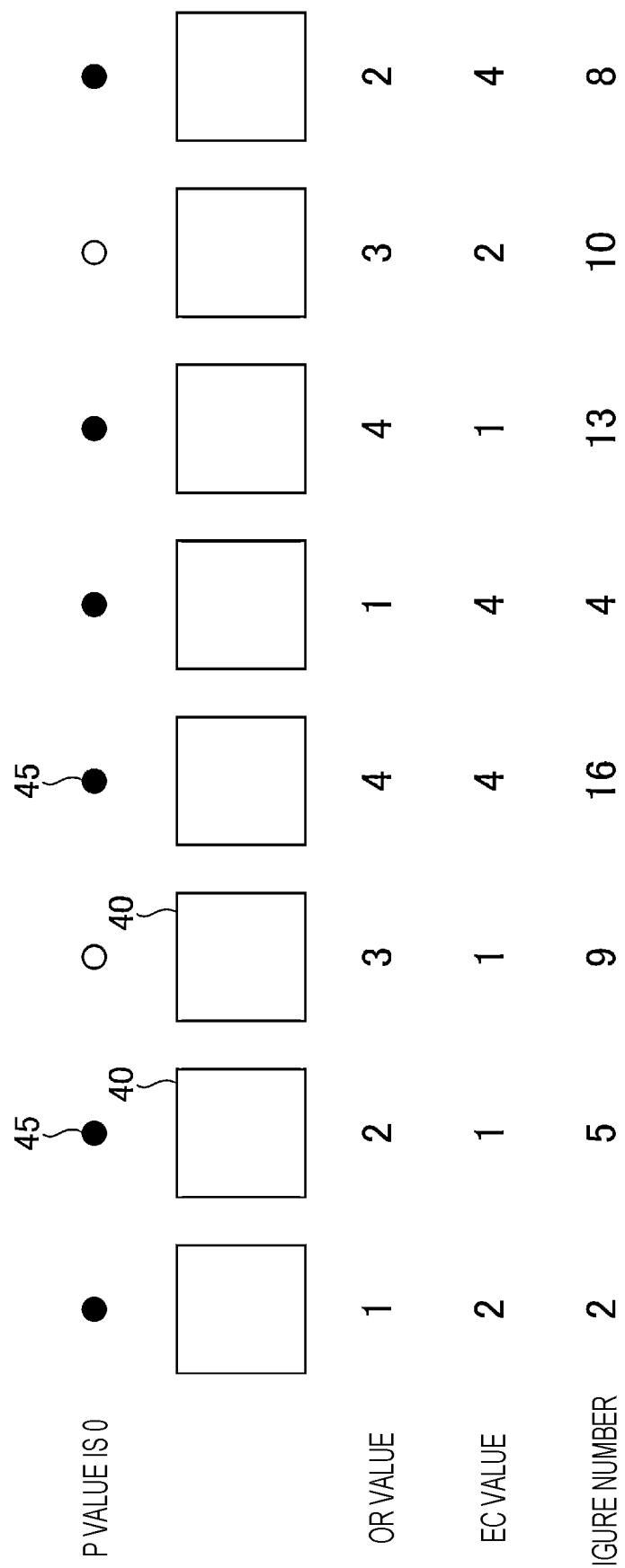
FIG. 14 is a diagram for explaining a specific example of setting a figure number from an OR value, an EC value, and a P value (parity value).

In the direct designation mode, the base two-dimensional code can be detected from the two-dimensional code group 41 through a figure number. As described above, the figure number can be obtained by acquiring the P value, the OR value, and the EC value defined on the basis of a geometric feature of the two-dimensional code 40. Specifically, the OR value is detected through the pilot and the code orientation as illustrated in FIG. 14, the P value (parity value) can be obtained by detection based on the light and dark points of the pilots 45 (and the numbers of light and dark points), and the EC value can be obtained by detection of the error correction capacity. The evaluation value including the P value, the OR value, and the EC value is used to acquire the figure number with reference to the table illustrated in FIG. 12. Then, it is checked whether the acquired figure number matches the figure number assigned to the base two-dimensional code. As a result, if the acquired figure number matches the figure number (any one of 2, 7, 11, 14, 17, 22, 26, and 31) assigned to the base two-dimensional code, the two-dimensional code 40 can be determined as the base two-dimensional code.

Next, a second setting value corresponding to the figure number of the base two-dimensional code is acquired. As illustrated in FIG. 12, the second setting value is associated with a first setting value on a one to-one basis. The second setting value indicates a time-series relative positional relationship from the base two-dimensional code. For example, if the second setting value is 3, the storage two-dimensional code described above is set at a position shifted three two-dimensional codes 40 from the base two-dimensional code serving as the starting point. When the storage two-dimensional code is reached, the target information stored therein is read.

In the generation of the two-dimensional code group 41, the target information is stored in the storage two-dimensional code relatively shifted in accordance with the second setting value corresponding to the figure number of the base two-dimensional code.

FIG. 15 illustrates an example of identifying the base two-dimensional code and the storage two-dimensional code in the direct designation mode. In FIG. 15(*a*), the figure number identified through the P value, the OR value, and the EC value is 2 and matches the figure number (any one of 2, 7, 11, 14, 17, 22, 26, and 31) assigned to the base two-dimensional code. Thus, the two-dimensional code 40 with the figure number=2 is identified as the base two-dimensional code. The figure number=2, which serves as a first setting value, is associated with a second setting value on a one to-one basis. In this case, the second setting value is 2. Thus, the storage two-dimensional code described above is set at a position shifted two two-dimensional codes 40 from the base two-dimensional code serving as the starting point. In FIG. 15(*b*), the figure number identified through the P value, the OR value, and the EC value is 22 and matches the figure number (any one of 2, 7, 11, 14, 17, 22, 26, and 31) assigned to the base two-dimensional code. Thus, the two-dimensional code 40 with the figure number=22 is identified as the base two-dimensional code. The figure number=22, which serves as a first setting value, is associated with a second setting value on a one to-one basis. In this case, the second setting value is 3. Thus, the storage two-dimensional code described above is set at a position shifted three two-dimensional codes 40 from the base two-dimensional code serving as the starting point.

The example of FIG. 15 defines the relative positional relationship in the chronologically forward direction (direction ahead). However, the present invention is not limited thereto, and the relative positional relationship in the chronologically backward direction (behind in time) may be defined.

In the indirect designation mode, the base two-dimensional code can be detected from the two-dimensional code group 41 through a figure number. As described above, the figure number can be obtained by acquiring the P value, the OR value, and the EC value defined on the basis of a geometric feature and the like of the two-dimensional code 40. Specifically, the OR value is detected through the pilot and the code orientation as illustrated in FIG. 14, the P value (parity value) can be obtained by, as illustrated in FIG. 14, detection based on the light and dark points of the pilots 45 (or the numbers of light and dark points), and the EC value can be obtained by detection of the error correction capacity. The evaluation value including the OR value, the EC value, and the P value (parity value) is used to acquire the figure number with reference to the table illustrated in FIG. 13. Then, it is checked whether the acquired figure number matches the figure number assigned to the index two-dimensional code. As a result, if the acquired figure number matches the figure number (any one of 2, 7, 11, 14, 17, 22, 26, and 31) assigned to the index two-dimensional code, the two-dimensional code 40 can be determined as the index two-dimensional code.

The index two-dimensional code stores information related to the amount of shift to the base two-dimensional code or the first setting value of the base two-dimensional code. Thus, if the index two-dimensional code can be detected, the amount of shift or the first setting value stored in the index two-dimensional code is read, and as a result, the amount of shift to the base two-dimensional code or the first setting value can be acquired.

The base two-dimensional code is identified through the acquired amount of shift to the base two-dimensional code or through the acquired first setting value.

The base two-dimensional code is identified through the amount of shift by, for example, as illustrated in FIG. 16(*a*), setting the base two-dimensional code at a position shifted three two-dimensional codes 40 from the index two-dimensional code in the forward direction (or the reverse direction) if the amount of shift read from the index two-dimensional code is 3. If the first setting value read from the index two-dimensional code is 16, the two-dimensional code 40 having the first setting value (figure number) is set as the base two-dimensional code.

In the example of FIG. 16(*b*), the amount of shift read from the index two-dimensional code is 5. In this case, the base two-dimensional code is set at a position shifted five two-dimensional codes 40 from the index two-dimensional code in the forward direction (or the reverse direction). If the first setting value read from the index two-dimensional code is 25, the two-dimensional code 40 having the first setting value (figure number) is set as the base two-dimensional code.

Next, a second setting value corresponding to the figure number of the base two-dimensional code is acquired. As illustrated in FIG. 13, as in the direct designation mode, the second setting value is associated with a first setting value on a one to-one basis. The second setting value indicates a time-series relative positional relationship from the base two-dimensional code. According to the example of FIG. 16(*a*), since the second setting value is 1, the storage two-dimensional code described above is set at a position shifted one two-dimensional code 40 from the base two-dimensional code serving as the starting point. According to the example of FIG. 16(*b*), since the second setting value is 2, the storage two-dimensional code described above is set at a position shifted two two-dimensional codes 40 from the base two-dimensional code serving as the starting point.

As described above, in the indirect designation mode, the index two-dimensional code is identified simply mechanically by a combination of the P value, the OR value, and the EC value, and the amount of shift or the first setting value stored in the index two-dimensional code is read to detect the base two-dimensional code having the figure number corresponding thereto. Then, the storage two-dimensional code based on the relative positional relationship corresponding to the figure number (first setting value) of the base two-dimensional code is identified, and the target information stored therein is read.

That is, according to the present invention, if the index two-dimensional code or the base two-dimensional code can be picked up simply mechanically by a combination of values based on features serving as indices such as the P value, the OR value, and the EC value, a storage two-dimensional code can be indirectly identified therefrom, and target information described therein is read to obtain desired information. Thus, the load of information processing can be extremely reduced. In addition, according to the present invention, the remaining two-dimensional codes 40, other than the index two-dimensional code, the base two-dimensional code, the storage two-dimensional code, and the target information, may be configured in any form as long as the geometric requirements associated with the figure numbers are satisfied, and the two-dimensional codes 40 having any content and format can be generated and arranged. Thus, the load of code generation can also be reduced.

In the embodiment described above, a case where the index two-dimensional code or the base two-dimensional code is identified through an evaluation value including a combination of the P value, the OR value, and the EC value has been described as an example. However, the present invention is not limited thereto. The index two-dimensional code or the base two-dimensional code may be identified through an evaluation value defined on the basis of at least any information on at least an inclination and a direction related to display of the two-dimensional code, the model number, the front or back side of an inverted mirror image of the code symbol, the display position, the display order, the light and dark reversal of the image, the light and dark colors of the code, the kind of the two-dimensional code, an identifier number related to the standard mask pattern of the two-dimensional code, an error correction word included in the two-dimensional code, and a codeword at a specific position among data-block constituting codewords including a data codeword and an error correction codeword constituting the two-dimensional code.

Data Configuration of Index Two-Dimensional Code: Storage of Information on Base Two-Dimensional Code The role of the index two-dimensional code is to store the figure number of the base two-dimensional code, the amount of shift to the base two-dimensional code, and so on.

Element Conversion

A dynamic change of each of the two-dimensional codes 40 constituting the two-dimensional code group 41 with the occurrence of a specific event is referred to as "element conversion" of the constituent codes. The element conversion, as used here, is to reset the arrangement of the index two-dimensional code, the base two-dimensional code, and the storage two-dimensional code while keeping the stored information invariable, and to regenerate and rearrange the two-dimensional codes 40. In other words, the element conversion means to reconfigure the chronological arrangement of the two-dimensional codes playing respective roles, such as the index two-dimensional code and the base two-dimensional code, while keeping the information represented by the series of two-dimensional code groups 41 invariable. When the two-dimensional codes constituting the two-dimensional code group 41 are to be dynamically displayed in a time series, the two-dimensional codes are constituted by a plurality of still images, that is, two-dimensional code symbols. A change is given to each of the still images to form a set of related still images, and constituent elements are arranged on the time axis. As a result, truly dynamic two-dimensional codes are constructed. A so-called frame rate is the speed of change on the time axis, and the practical speed is, for example, about 10 fps to 30 fps. After a predetermined amount of time elapses from the start of the dynamic display, or in response to detection of a predetermined external event such as a display request, the configuration of the two-dimensional codes constituting the two-dimensional code group 41 is dynamically changed. In the present invention, which is based on a more flexible configuration principle, a moving image (i.e., a set of a plurality of still images) may display a piece of information as a whole, or information identified/acquired through a series of flows of individual still images (two-dimensional codes 40) may be provided.

The timing of display reconfiguration by "element conversion" is, for example, the time of periodic reconfiguration every several minutes or the time of detection of an event of a display operation. Such a timing needs to be defined on the user side or the system side in advance.

The purpose of performing such "element conversion" is to shorten the expiration date of the display configuration of the given dynamic two-dimensional code group 41 to make malicious analysis extremely difficult and to, additionally, make it difficult to copy (duplicate) a code, which has been an essential problem with the still images (the individual two-dimensional codes 40). To this end, information for identifying the expiration date of the display configuration may be included as a constituent element of the target information.

In the "element conversion", furthermore, after the configuration of the evaluation values is updated to generate and arrange data blocks, light and dark modules may further be arranged to configure a two-dimensional code. The element conversion may also include, in addition to generation and arrangement of the data blocks, a change due to the arrangement of the light and dark modules caused by a change in the standard mask even in the same data block.

Types of Configuration Modes

Configuration modes can be roughly classified into the following two types: 1) a mode in which information stored in the storage two-dimensional code itself is set as the target information (hereinafter, referred to as simple mode); and 2) a mode in which information reconfigured by a set of two or more constituent two-dimensional codes including the storage two-dimensional code and based on a format such as the so-called structured append format, which are designated by information stored in the storage two-dimensional code, is set as the target information (hereinafter referred to as a related code configuration mode). That is, configuration modes can be classified in accordance with whether the target information is stored in one storage two-dimensional code or stored in the storage two-dimensional code and another storage two-dimensional code. In the related code configuration mode, the target information is stored in other storage two-dimensional codes including the identified storage two-dimensional code and related to each other.

The configuration modes (the simple mode and the related code configuration mode) will be described hereinafter.

Simple Mode

In the simple mode, the target information is stored in a single storage two-dimensional code. The "element conversion" of the constituent codes described above is performed for each predefined event (elapsed time or display event). As a result, a combination of constituent two-dimensional codes can be used one time. In the "element conversion", the target information needs to be invariable except for an element for identifying the expiration date. The constituent elements of the two-dimensional code 40, other than the target information, may be variable (on the time axis) with the passage of time or the occurrence of an event.

In the simple mode, as illustrated in FIGS. 14 to 16, a storage two-dimensional code away from the identified base two-dimensional code by an associated amount of shift is identified. The storage two-dimensional code itself stores the target information.

Related Code Configuration Mode

In the related code configuration mode, as illustrated in FIG. 17, a single or a plurality of two-dimensional codes at specific relative positions described in the storage two-dimensional code, including the storage two-dimensional code itself, have structures related to each other according to a format such as the so-called structured append format to construct information (data), which is set as the target information. In the related code configuration mode, the target information is used to generate and arrange data blocks constructed by storing the target information in, in addition to a storage two-dimensional code, other storage two-dimensional codes having relevance with each other.

The display is switched by a series of constituent two-dimensional codes subjected to "element conversion" when a predetermined amount of time elapses from the display start (generation) or when a display request event occurs. At this time, the target information stored in the structured-append constituent two-dimensional codes (in an example of FIG. 17, two constituent two-dimensional codes) is invariable.

Information Update

The information stored in each two-dimensional code 40 can be updated at any time when various events occur or according to the intention on the user or system side.

This update may be performed by rewriting a portion of the target information stored in the storage two-dimensional code, or may be performed by deleting a portion of the target information stored in the storage two-dimensional code. Alternatively, the update may be performed when data blocks based on new content of information added to the target information stored in the storage two-dimensional code are generated and arranged. When data blocks based on the content of the target information to be updated are to be generated and arranged in a storage two-dimensional code and one or more other storage two-dimensional codes, relevance information indicating relevance between the storage two-dimensional code and the one or more other storage two-dimensional codes may be stored in these codes. Further, after the update is performed, history information related to the history of the update may be recorded in the storage two-dimensional code. This makes it possible to improve the convenience of the update process. The history information may also be stored when the element conversion described above is performed.

The invention claimed is:

1. A dynamic two-dimensional code group generation method for generating a two-dimensional code group for dynamically displaying, repeatedly in sequence, a plurality of two-dimensional codes arranged in a time series, the dynamic two-dimensional code group generation method comprising:

a base identifying step of determining a first setting value of a base two-dimensional code serving as a base from among first setting values identified by evaluation values each associated with a corresponding one of the two-dimensional codes in the two-dimensional code group;

a data block arrangement step of generating and arranging a data block in a storage two-dimensional code identified on the basis of a second setting value corresponding to the first setting value determined in the base identifying step, the data block based on content of target information to be coded; and a first setting value storing step of storing, in an index two-dimensional code assigned through the first setting values identified by the evaluation values, information related to the first setting value of the base two-dimensional code serving as the base or information related to an amount of shift to the base two-dimensional code, wherein in the base identifying step or in the first setting value storing step, the first setting values are identified through evaluation values each defined on the basis of at least one or more of a geometric feature or a logical feature of a corresponding one of the two-dimensional codes, the geometric feature or the logical feature being any one of at least a feature value related to a light appearance and a dark appearance of the corresponding one of the two-dimensional codes, a feature of a pilot added around the corresponding one of the two-dimensional codes and indicating an index origin of a code orientation direction, an inclination and a direction related to display of the corresponding one of the two-dimensional codes, a front or back side of an inverted mirror image of a code symbol of the corresponding one of the two-dimensional codes, a display position and a display order of the corresponding one of the two-dimensional codes, light and dark colors constituting the corresponding one of the two-dimensional codes, a kind of the corresponding one of the two-dimensional codes, an identifier number related to a standard mask pattern of the corresponding one of the two-dimensional codes, error correction capacity and a model number included in the corresponding one of the two-dimensional codes, and a codeword at a specific position among data-block constituting codewords including a data codeword and an error correction codeword constituting the corresponding one of the two-dimensional codes.

2. The dynamic two-dimensional code group generation method according to claim 1, wherein
in the data block arrangement step, the storage two-dimensional code is identified on the basis of the second setting value corresponding to the first setting value determined in the base identifying step, with reference to a correspondence relationship between the first setting value and the second setting value indicating a time-series relative positional relationship from the base two-dimensional code.

3. The dynamic two-dimensional code group generation method according to claim 1, further comprising:
an element conversion step of updating a configuration of an evaluation value, among the evaluation values, for another constituent two-dimensional code constituting the dynamic two-dimensional code group together with the storage two-dimensional code to generate and arrange a data block while keeping content of the target information stored in the storage two-dimensional code invariable when any one of event conditions including an event condition indicating that a predetermined amount of time has elapsed since a start of the repeated dynamic display and an event condition indicating that a predetermined external event is detected is satisfied.

4. The dynamic two-dimensional code group generation method according to claim 1, further comprising:
an element conversion step of updating a configuration of evaluation values, among the evaluation values, for other constituent two-dimensional codes including the storage two-dimensional code and constituting the dynamic two-dimensional code group to generate and arrange a data block while keeping content of the target information stored in the storage two-dimensional code invariable, on the basis of any one of a time when any one of event conditions including an event condition indicating that a predetermined amount of time has elapsed since a start of the repeated dynamic display and an event condition indicating that a predetermined external event is detected is satisfied, content of the detected predetermined external event, and the cumulative number of updates.

5. The dynamic two-dimensional code group generation method according to claim 1, further comprising:
an update step of performing an update by rewriting a portion of the target information stored in the storage two-dimensional code.

6. The dynamic two-dimensional code group generation method according to claim 1, further comprising:
an update step of performing an update by deleting a portion of the target information stored in the storage two-dimensional code.

7. The dynamic two-dimensional code group generation method according to claim 1, further comprising:
an update step of performing an update by generating and arranging a data block based on new content of information added to the target information stored in the storage two-dimensional code.

8. The dynamic two-dimensional code group generation method according to claim 1, further comprising:
an update step of, when a data block based on content of the target information to be updated is to be generated and arranged in the storage two-dimensional code and one or more other storage two-dimensional codes, storing, in them, relevance information indicating relevance between the storage two-dimensional code and the one or more other storage two-dimensional codes.

9. The dynamic two-dimensional code group generation method according to claim 3, wherein
in the element conversion step, after the element conversion is performed, history information regarding a history of the element conversion or the update is recorded in the storage two-dimensional code.

10. The dynamic two-dimensional code group generation method according to claim 5, wherein in the update step, after the update is performed, history information regarding a history of the element conversion or the update is recorded in the storage two-dimensional code.

11. A dynamic two-dimensional code group evaluation method for evaluating a two-dimensional code group generated by the dynamic two-dimensional code group generation method according to claim 1, the dynamic two-dimensional code group evaluation method comprising:
an image capturing step of capturing images of the plurality of two-dimensional codes that are to be dynamically displayed repeatedly to capture a moving image;
a first setting value detection step of detecting a first setting value of a base two-dimensional code serving as a base from among first setting values identified through evaluation values each associated with a corresponding one of the two-dimensional codes included in the moving image captured in the image capturing step; and
reading the target information from the storage two-dimensional code identified on the basis of a second setting value corresponding to the first setting value of the base two-dimensional code detected in the first setting value detection step.

12. A dynamic two-dimensional code group evaluation method for evaluating a two-dimensional code group generated by the dynamic two-dimensional code group generation method according to claim 1, the dynamic two-dimensional code group evaluation method comprising:
an image capturing step of capturing images of the plurality of two-dimensional codes that are to be dynamically displayed repeatedly to capture a moving image;
an index two-dimensional code detection step of detecting an index two-dimensional code through an evaluation value of each of the two-dimensional codes included in the moving image captured in the image capturing step;

a first setting value detection step of identifying the base two-dimensional code by detecting a first setting value of the base two-dimensional code or an amount of shift to the base two-dimensional code stored in the index two-dimensional code detected in the index two-dimensional code detection step; and a read step of reading the target information from the storage two-dimensional code identified on the basis of a second setting value corresponding to the first setting value detected in the first setting value detection step.

13. A dynamic two-dimensional code group generation system for generating a two-dimensional code group for dynamically displaying, repeatedly in sequence, a plurality of two-dimensional codes arranged in a time series, the dynamic two-dimensional code group generation system comprising:

base identifying means for determining a first setting value of a base two-dimensional code serving as a base from among first setting values identified by evaluation values each associated with a corresponding one of the two-dimensional codes in the two-dimensional code group; and data block arrangement means for generating and arranging a data block in a storage two-dimensional code identified on the basis of a second setting value corresponding to the first setting value determined by the base identifying means, the data block being based on content of target information to be coded.

14. A dynamic two-dimensional code group evaluation system for evaluating a two-dimensional code group generated by the dynamic two-dimensional code group generation system according to claim 13, the dynamic two-dimensional code group evaluation system comprising:

image capturing means for capturing images of the plurality of two-dimensional codes that are to be dynamically displayed repeatedly to capture a moving image;

first setting value detection means for detecting a first setting value of a base two-dimensional code serving as a base from among first setting values identified through evaluation values each associated with a corresponding one of the two-dimensional codes included in the moving image captured by the image capturing means; and read means for reading the target information from the storage two-dimensional code identified on the basis of a second setting value corresponding to the first setting value detected by the first setting value detection means.

15. A dynamic two-dimensional code group comprising a two-dimensional code group for dynamically displaying, repeatedly in sequence, a plurality of two-dimensional codes arranged in a time series, wherein a first setting value of a base two-dimensional code serving as a base is determined from among first setting values identified by evaluation values each associated with a corresponding one of the two-dimensional codes in the two-dimensional code group, and a data block based on content of target information to be coded is generated and arranged in a storage two-dimensional code identified on the basis of a second setting value corresponding to the determined first setting value.

* * * * *